(12) United States Patent
Suzuki et al.

(10) Patent No.: US 9,513,824 B2
(45) Date of Patent: Dec. 6, 2016

(54) CONTROL METHOD, CONTROL DEVICE, AND RECORDING MEDIUM

(71) Applicant: FUJITSU LIMITED, Kawasaki-shi, Kanagawa (JP)

(72) Inventors: Hiroyuki Suzuki, Mishima (JP); Norio Kurobane, Yokohama (JP); Sokichi Fujita, Chiyoda (JP); Jianping Li, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 14/614,791

(22) Filed: Feb. 5, 2015

(65) Prior Publication Data
US 2015/0149720 A1 May 28, 2015

Related U.S. Application Data

(63) Continuation of application No. PCT/JP2012/072630, filed on Sep. 5, 2012.

(51) Int. Cl.
*G06F 12/12* (2016.01)
*G06F 3/06* (2006.01)
*G06F 12/08* (2016.01)

(52) U.S. Cl.
CPC .......... *G06F 3/0617* (2013.01); *G06F 3/0608* (2013.01); *G06F 3/0659* (2013.01); *G06F 3/0685* (2013.01);
(Continued)

(58) Field of Classification Search
CPC ... G06F 3/0617; G06F 3/0685; G06F 12/0871
(Continued)

(56) References Cited

U.S. PATENT DOCUMENTS 5,761,531 A 6/1998 Ohmura et al.
6,000,006 A * 12/1999 Bruce et al. ........ G06F 11/1068
711/103
(Continued)

FOREIGN PATENT DOCUMENTS

JP 9-16474 1/1997
JP 10-040170 2/1998
(Continued)

OTHER PUBLICATIONS

Office Action, dated Apr. 5, 2016, in corresponding Japanese Application No. 2014-534083 (6 pp.)
(Continued)

*Primary Examiner* — Jae Yu
(74) *Attorney, Agent, or Firm* — Staas & Halsey LLP

(57) ABSTRACT

A non-transitory computer-readable recording medium has stored therein a program that causes a computer to execute a control process. The control process includes: receiving an access request for a recording device that stores data; determining whether or not index information corresponding to the access request, which is received at the receiving, is stored in a memory that stores index information that is obtained by shortening identification information identifying data from the recording device cached in a non-volatile memory; and accessing the non-volatile memory when it is determined that the index information is stored in the memory and accessing the recording device when it is determined that the index information is not in the memory.

12 Claims, 19 Drawing Sheets

(52) U.S. Cl.
CPC ....... *G06F 12/0871* (2013.01); *G06F 12/0864* (2013.01); *G06F 2212/1024* (2013.01); *G06F 2212/152* (2013.01); *G06F 2212/222* (2013.01); *G06F 2212/284* (2013.01)

(58) Field of Classification Search
USPC ......................................................... 711/118
See application file for complete search history.

(56) References Cited

U.S. PATENT DOCUMENTS

| | | |
|---|---|---|
| 2002/0184432 A1 | 12/2002 | Ban |
| 2003/0145167 A1 | 7/2003 | Tomita |
| 2008/0016274 A1* | 1/2008 | Wang et al. ........ G06F 11/1441 711/113 |
| 2011/0066879 A1* | 3/2011 | Nakai ....................... G06F 8/63 714/6.2 |

FOREIGN PATENT DOCUMENTS

| | | |
|---|---|---|
| JP | 2003-223284 | 8/2003 |
| JP | 2004-522230 | 7/2004 |
| JP | 2008-097132 | 4/2008 |

OTHER PUBLICATIONS

International Search Report and Written Opinion, dated Nov. 20, 2012, in International Application No. PCT/JP2012/072630 (12 pp.)

* cited by examiner

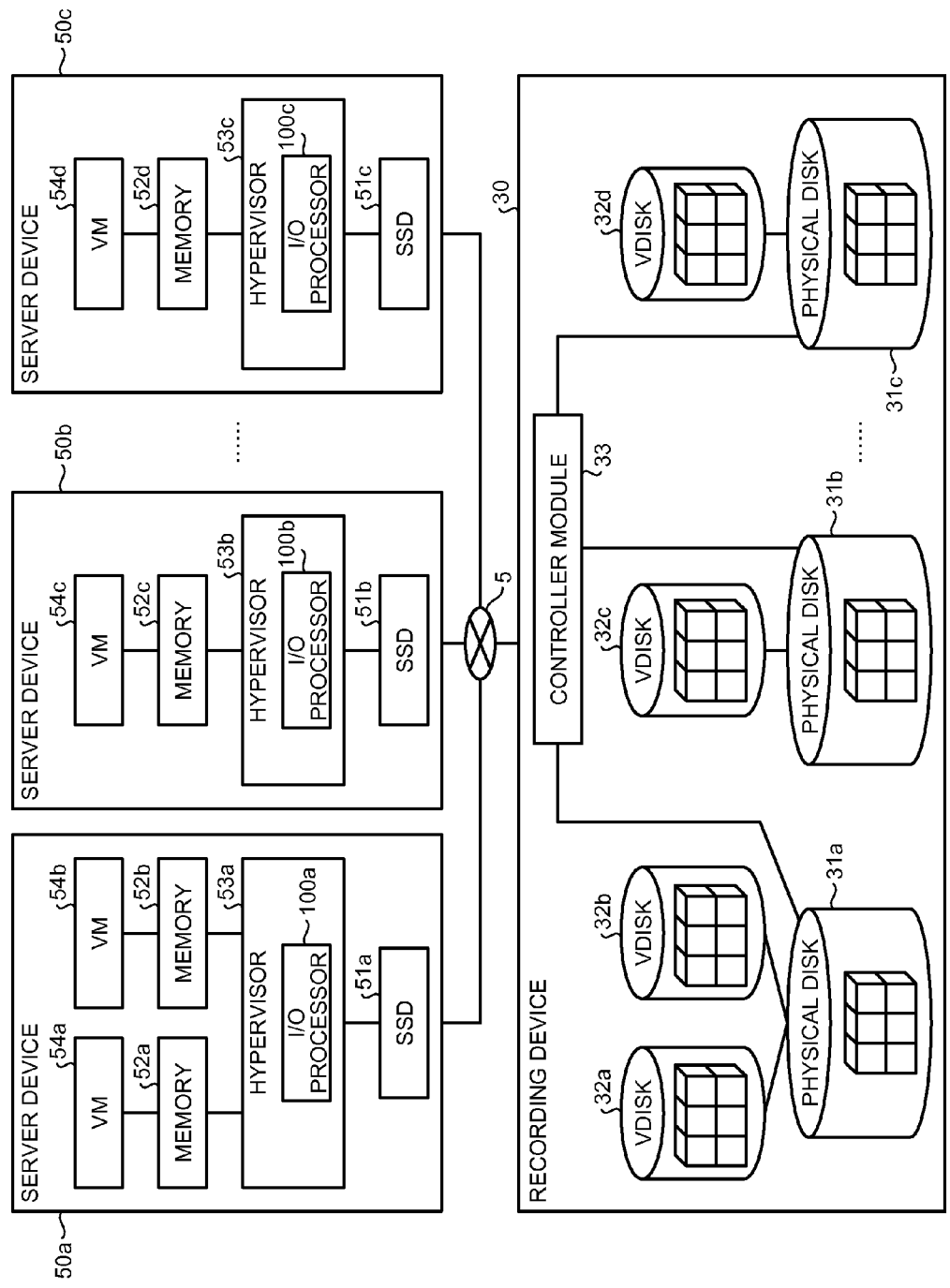

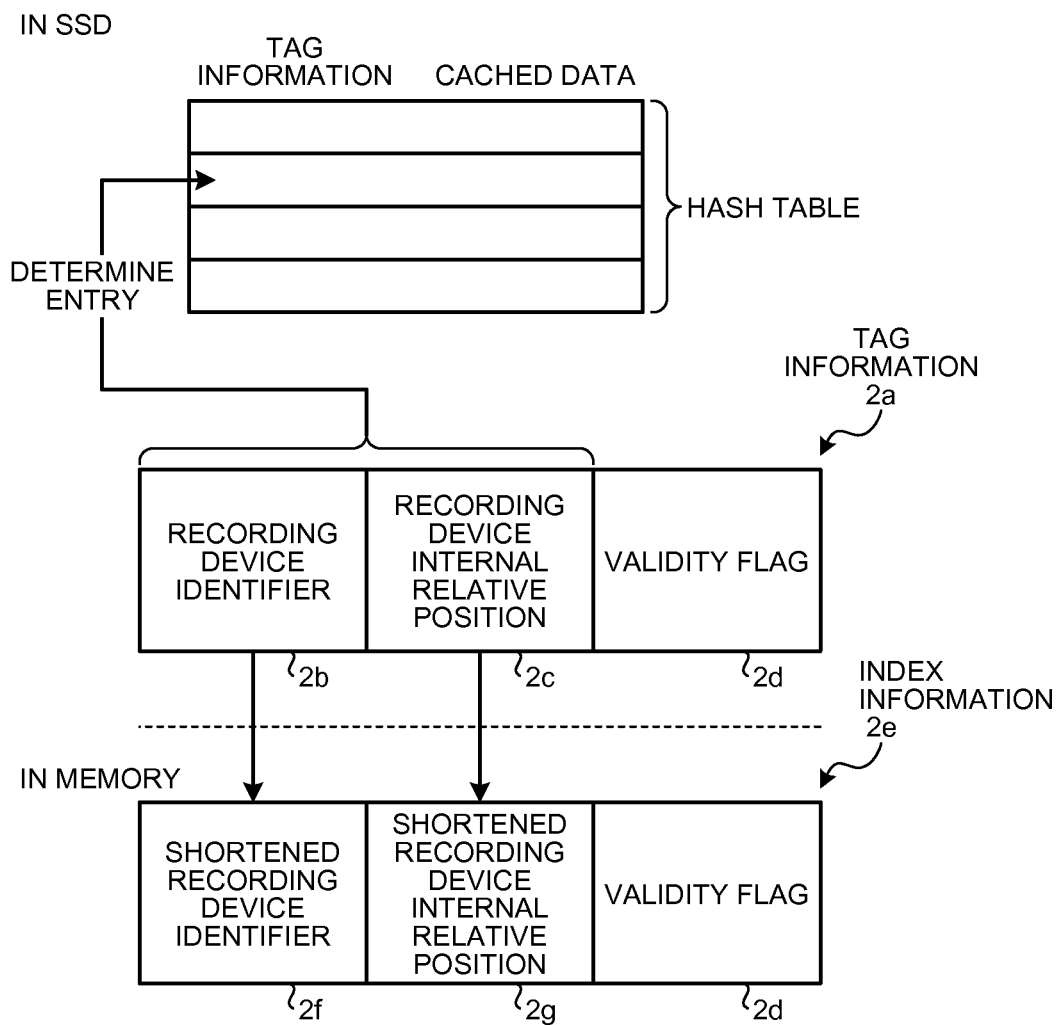

FIG.3

| TAG AND INDEX NAMES | SHORTENING METHOD TYPE | RECORDING DEVICE IDENTIFIER / SHORTENED RECORDING DEVICE IDENTIFIER | RECORDING DEVICE INTERNAL RELATIVE POSITION / SHORTENED RECORDING DEVICE INTERNAL RELATIVE POSITION | VALIDITY FLAG |
|---|---|---|---|---|
| TAG A | - | abE0a1-5dPX-ITpk-4AmA-azC2-4zzC-0m0cLX | 1357246864 | 1 |
| TAG B | - | cdE0a2-6dXX-IRkm-3LcQ-qrC2-4zzC-0m0cPY | 24681357987 | 1 |
| TAG C | - | acQ0a7-1eOL-INxi-3PzM-pIW4-4zzC-0m0cLX | 39157246864 | 1 |
| INDEX OF TAG A | HASH FUNCTION (md5) | d879c335adcdef3031f1cb633c5b8811 | 4fce9ebe3353bd976aa708bb3d7ba75f | 1 |
| INDEX OF TAG B | HASH FUNCTION (md5) | c4ac4aab86e5a67c0bc483b438f97456 | dcfa064dd03ba207fc9bd8ab70a438c6 | 1 |
| INDEX OF TAG C | HASH FUNCTION (md5) | ecb224915960c98b69667fef3159e1ce | b554a0cacfbbcd3175d51fa6a679eb61 | 1 |
| INDEX OF TAG A | PARTIAL TAG (LAST TAKEN OUT) | 4zzC-0m0cLX | 572246864 | 1 |
| INDEX OF TAG B | PARTIAL TAG (LAST TAKEN OUT) | 4zzC-0m0cPY | 81357987 | 1 |
| INDEX OF TAG C | PARTIAL TAG (LAST TAKEN OUT) | 4zzC-0m0cLX | 572246864 | 1 |

FIG.9

| TOTAL LENGTH | | LAST POINTER |
|---|---|---|
| TIME | RECORDING DEVICE IDENTIFIER | RECORDING DEVICE INTERNAL RELATIVE POSITION |
| TIME | RECORDING DEVICE IDENTIFIER | RECORDING DEVICE INTERNAL RELATIVE POSITION |
| TIME | RECORDING DEVICE IDENTIFIER | RECORDING DEVICE INTERNAL RELATIVE POSITION |
|  |  |  |
|  |  |  |
|  |  |  |
|  |  |  |
|  |  |  |
| ... | ... | ... |

FIG.10

| 2048 | | 1024 |
|---|---|---|
| 2012030108510318 | abE0a1-5dPX-ITpk-4AmA-azC2-4zzC-0m0cLX | 1357246864 |
| 2012030108510811 | cdE0a2-6dXX-IRkm-3LcQ-qrC2-4zzC-0m0cPY | 24681357987 |
| 2012030108511205 | acQ0a7-1eOL-INxi-3PzM-plW4-4zzC-0m0cLX | 39157246864 |
| 2012030108512279 | abE0a1-5dPX-ITpk-4AmA-azC2-4zzC-0m0cLX | 1357246864 |
| 2012030108512836 | acQ0a7-1eOL-INxi-3PzM-plW4-4zzC-0m0cLX | 39157246864 |
| 2012030108513428 | abE0a1-5dPX-ITpk-4AmA-azC2-4zzC-0m0cLX | 1357246864 |
| 2012030108514001 | acQ0a7-1eOL-INxi-3PzM-plW4-4zzC-0m0cLX | 39157246864 |
| ... | ... | ... |
| ... | ... | ... |

CONTROL METHOD, CONTROL DEVICE, AND RECORDING MEDIUM

CROSS-REFERENCE TO RELATED APPLICATION

This application is a continuation application of International Application No. PCT/JP2012/072630 filed on Sep. 5, 2012 and designating the U.S., the entire contents of which are incorporated herein by reference.

FIELD

The embodiments discussed herein are related to a control program, a control method, and a control device.

BACKGROUND

There is a related technology using, as a cache of a storage system, an SSD (Solid State Drive) on which a non-volatile semiconductor memory, such as a NAND flash memory, is mounted. For example, the data in a disk device on a network is cached in an SSD in a server device to which an access faster than that to the disk device can be made. Improvements in accessibility are made by using, as tag information, information on the storage location and the data size of the cached data.

Furthermore, for example, data is cached in the SSD and a control program causes the tag information on all the cached data to be stored in the memory in the server device. With reference to the tag information stored in the memory, it is determined whether there is the cached data or not.

Patent Document 1: Japanese Laid-open Patent Publication No. 10-040170

Patent Document 2: Japanese Laid-open Patent Publication No. 2003-223284

However, the related technology has a problem in that it is not possible to increase the accessibility while reducing the memory usage. For example, the related technology stores the tag information on all the data cached in the SSD in the memory, which increases the memory usage.

Furthermore, for example, for the related technology, a mode can be assumed where the tag information on the cached data is not stored in the memory and an access to the SSD is made to determine whether there is the cached data or not. In this case, while the memory usage can be reduced, an access to the SSD is made each time an access to the data occurs. If there is not the data cached in the SSD, an access is made to the data stored in the disk device; however, in this case, an access to the SSD occurs before the access to the disk device, which lowers the data accessibility. As described above, it is difficult for the related technology to increase the data accessibility while reducing the memory usage.

SUMMARY

According to an aspect of the embodiments, a non-transitory computer-readable recording medium has stored therein a program that causes a computer to execute a control process. The control process includes: receiving an access request for a recording device that stores data; determining whether or not index information corresponding to the access request, which is received at the receiving, is stored in a memory that stores index information that is obtained by shortening identification information identifying data from the recording device cached in a non-volatile memory; and accessing the non-volatile memory when it is determined that the index information is stored in the memory and accessing the recording device when it is determined that the index information is not in the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of a functional configuration of an information processing system according to a first embodiment;

FIG. 2 is a diagram to describe exemplary tag information and index information according to the first embodiment;

FIG. 3 is a table to describe exemplary tag information and index information according to the first embodiment;

FIG. 9 is a table to describe exemplary history information according to the second embodiment;

FIG. 10 is a table to describe exemplary history information according to the second embodiment;

DESCRIPTION OF EMBODIMENTS

Figure 4:
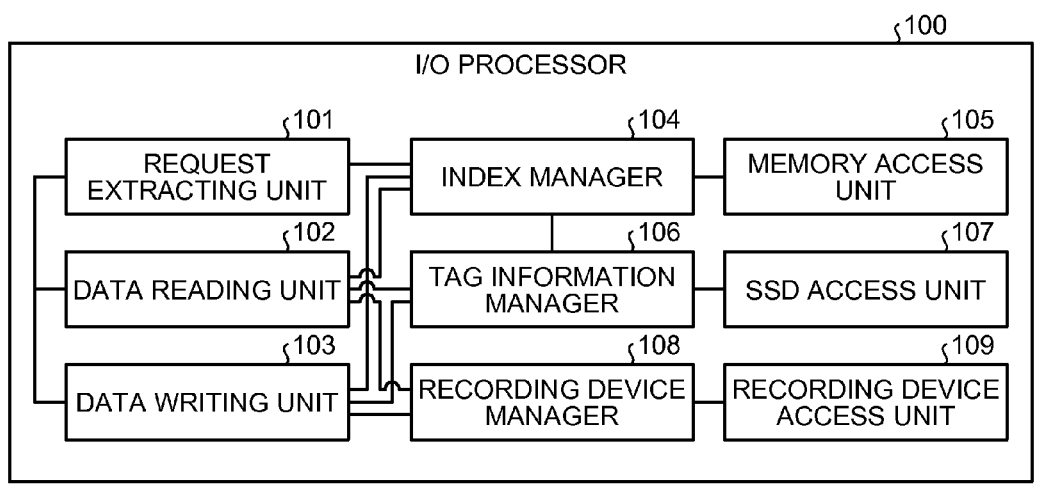
FIG. 4 is a block diagram of an exemplary functional configuration of an I/O processor according to the first embodiment.

Preferred embodiments will be explained with reference to accompanying drawings. The embodiments do not limit the invention.

[a] First Embodiment

An exemplary functional configuration of an information processing system according to a first embodiment will be described here. FIG. 1 is a block diagram of the functional configuration of the information processing system according to the first embodiment. As depicted in FIG. 1, the system includes a recording device 30 and server devices 50a, 50b and 50c. The recording device 30 and the server devices 50a, 50b and 50c are connected one another via a network 5. For the network 5, any type of communication network, such as the Internet or a LAN (Local Area Network), can be used regardless of whether it is wired or wireless. In the example depicted in FIG. 1, the information processing system includes the three server devices 50a, 50b and 50c; however, the configuration is not limited to that depicted in FIG. 1. In other words, any number of server devices 50 may be connected to the information processing system. Alternatively, the server devices 50a, 50b and 50c will be generally referred to as the server device 50 without distinction.

the recording device 30 is a device that stores data. For example, the recording device 30 receives and transmits data that is stored in the recording device 30 in response to an access request from the server device 50. For example, the recording device 30 receives, from the server device 50, a read request for reading data. The recording device 30 transmits the data according to the received read request to the server device 50. Furthermore, for example, the recording device 30 receives, from the server device 50, a write request for writing data. The recording device 30 stores the data according to the received write request in a physical DISK 31 in the recording device 30. The read request and write request are exemplary access requests.

The recording device 30 includes physical DISKs 31a, 31b, and 31c and a controller module 33. The physical DISKs 31a, 31b and 31c are, for example, disk devices such as hard disk devices or optical disk devices. The physical DISKs 31a, 31b and 31c are accessed as virtual recording media VDISKs 32a, 32b, 32c and 32d by applications. The VDISKs 32a, 32b, 32c and 32d are virtual recording media that are implemented using one or more physical DISKs 31 mounted on the recording device 30. For example, the VDISKs 32a, 32b, 32c and 32d are configured per VM 54, which will be described below.

The controller module 33 is a device that controls data inputs to the physical DISK 31 and data outputs from the physical DISK 31. For example, the controller module 33 includes an interface for data communications between the server device 50 and the physical DISK 31 and a CPU (Central Processing Unit) that analyzes access requests from the server device 50.

The server device 50 is a device that performs information processing. For example, the server device 50 transmits an access request to the recording device 30 to read or write the data stored in the recording device 30.

The server device 50a includes an SSD (Solid State Drive 51a, memories 52a and 52b, and a hypervisor 53a. The server device 50a implements VMs (virtual machines) 54a and 54b using the hypervisor 53a. Because the server devices 50a, 50b and 50c have the same functional configuration, the server device 50a will be described here and descriptions of the server devices 50b and 50c will be omitted. Furthermore, "SSD 51" will be used to generally refer to the SSDs 51a, 51b and 51c without distinction and "memory 52" will be used to refer to the memories 52a, 52b, 52c and 52d generally without distinction. Similarly, "hypervisor 53" will be used to refer to the hypervisors 53a, 53b and 53c generally without distinction and "VM 54" will be used to generally refer to the VMs 54a, 54b, 54c and 54d without distinction.

The SSD 51 is, for example, a storage drive device that includes a non-volatile memory. The SSD 51 caches data that is transmitted from the recording device 30 and stores the tag information on the cached data. The memory 52 stores index information obtained by shortening the tag information stored in the SSD 51.

The hypervisor 53 implements a virtual machine by logically dividing or integrating physical calculator resources of the server device 50. The hypervisor 53a includes an I/O processor 100a. The I/O processor 100a controls data communications between the server device 50a and the recording device 30. The VM 54 is a virtual machine that is implemented by the hypervisor 53. The VM 54 executes given software on the VM 54 to provide various services. In response to operations by the user who uses the services, the VM 54 transmits an access request to the recording device 30. "I/O processor 100" is used to generally refer to the I/O processors 100a, 100b and 100c without distinction.

Upon receiving an access request that is transmitted from, for example, the VM 54a, the I/O processor 100 refers to the index information stored in the memory 52a and determines whether to access the SSD 51a or access the recording device 30.

With reference to FIGS. 2 and 3, exemplary tag information and index information according to the first embodiment will be described below. FIGS. 2 and 3 are diagrams to describe exemplary tag information and index information according to the first embodiment.

As depicted in FIG. 2, tag information 2a stored in the SSD 51 contains a recording device identifier 2b, a recording device internal relative position 2c, and a validity flag 2d. The recording device identifier 2b is information that identifies the physical disk 31 of the recording device 30. The recording device internal relative position 2c is information representing at which position in the recording device 30 the data according to the access request is. The recording device internal relative position 2c is, for example, a logical block number from the top that is allocated to the storage area of the recording device 30. The validity flag 2d is information representing whether the data in the SSD 51 that is identified by the tag information 2a is valid or invalid. For example, if the validity flag 2d is "1", it represents that the data is valid and, if the validity flag 2d is "0", it represents that the data is invalid. Entries of the data cached in the SSD 51 in a hash table are determined by the recording device identifier 2b and the recording device internal relative position 2c.

Index information 2e stored in the memory 52 contains shortened recording device identifier 2f, a shortened recording device internal relative position 2g, and a validity flag 2d. The shortened recording device identifier 2f is information obtained by shortening the recording device identifier 2b with a hash function. The shortened recording device internal relative position 2g is information obtained by shortening the recording device internal relative position 2c with a hash function. The recording device identifier 2b and the recording device internal relative position 2c are shortened by an index manager 104, which will be described below. Here, it is described that each of the recording device identifier 2b and the recording device internal relative position 2c are shortened with a hash function; however, the present invention is not limited to this. For example, each of the recording device identifier 2b and the recording device internal relative position 2c may be shortened by taking out only the last information of each of the recording device identifier 2b and the recording device internal relative position 2c.

FIG. 3 exemplifies the tag and index names, shortening method type, recording device identifier/shortened recording device identifier, recording device internal relative position/shortened recording device internal relative position, and validity flag in association with one another. The tag and index names represent the name to identify tag information or index information. The shortening method type represents the type of method of shortening the recording device identifier and the recording device internal relative position. The recording device identifier/shortened recording device identifier represents an exemplary recording device identifier or a shortened recording device identifier. The recording device internal relative position/shortened recording device internal relative position represents an exemplary recording device internal relative position or a shortened recording device internal relative position. The validity flag represents an exemplary validity flag. Note that the hyphens depicted in FIG. 3 represents that no corresponding data is contained.

The first row in FIG. 3 represents that the tag information "TAG A" contains the recording device identifier "abE0a1-5dPX-ITpk-4AmA-azC2-4zzC-OmOcLX", the recording device internal relative position "1357246864", and a validity flag "1". The second row in FIG. 3 represents that the tag information "TAG B" contains the recording device identifier "cdE0a2-6dXX-IRkm-3LcQ-qrC2-4zzC-0m0cPY", the recording device internal relative position "24681357987", and the validity flag "1". The third row in FIG. 3 represents that the tag information "TAG C" contains the recording device identifier "acQ0a7-1eOL-INxi-3PzM-p1W4-4zzC-OmOcLX", the recording device internal relative position "39157246864", and the validity flag "1".

The fourth to sixth rows in FIG. 3 represent the index information obtained by shortening each of "TAG A", "TAG B" and "TAG C" depicted in the first to third rows with a hash function. A case where the information is hashed according to a command referred to as md5 is depicted as an example. The fourth row in FIG. 3 represents that the index information "INDEX OF TAG A" contains the shortened recording device identifier "d879c335adcdef3031f1cb633c5b8811". The fourth row in FIG. 3 also represents that the index information "INDEX OF TAG A" contains the shortened recording device internal relative position "4fce9ebe3353bd976aa708bb3d7ba75f" and the validity flag "1". The fifth row in FIG. 3 represents that the index information "INDEX OF TAG B" contains the shortened recording device identifier "c4ac4aab86e5a67c0bc483b438f97456". The fifth row in FIG. 3 also represents that the index information "INDEX OF TAG B" contains the shortened recording device internal relative position "dcfa064dd03ba207fc9bd8ab70a438c6" and the validity flag "1". The sixth row in FIG. 3 represents that the index information "INDEX OF TAG C" contains the shortened recording device identifier "ecb224915960c98b69667fef3159e1ce". The sixth row in FIG. 3 also represents that the index information "INDEX OF TAG C" contains the shortened recording device internal relative position "b554a0cacfbbcd3175d51fa6a679eb61" and the validity flag "1".

The seventh to ninth rows in FIG. 3 represent the index information obtained by shortening each of "TAG A", "TAG B" and "TAG C" by taking out only the last information. Here, for example, the last eleven digits of the recording device identifier and the last eight digits of the recording device internal relative position are taken out. The seventh row in FIG. 3 represents that the index information "INDEX OF TAG A" contains the shortened recording device identifier "4zzC-OmOcLX", the shortened recording device internal relative position "57246864", and the validity flag "1". The eighth row in FIG. 3 represents that the index information "INDEX OF TAG B" contains the shortened recording device identifier "4zzC-0m0cPY", the shortened recording device internal relative position "81357987", and the validity flag "1". The ninth row in FIG. 3 represents that the index information "INDEX OF TAG C" contains the shortened recording device identifier "4zzC-OmOcLX", the shortened recording device internal relative position "57246864", and the validity flag "1". Index information obtained by taking out only a part of information is also referred to as a "partial tag".

With reference to FIG. 4, the functional configuration of the I/O processor 100 according to the first embodiment will be described here. FIG. 4 is a block diagram of an exemplary functional configuration of the I/O processor 100 according to the first embodiment.

As depicted in FIG. 4, the I/O processor 100 includes a request extracting unit 101, a data reading unit 102, a data writing unit 103, an index manager 104, a memory access unit 105, a tag information manager 106, an SSD access unit 107, a recording device manager 108, and a recording device access unit 109. The functions of the I/O processor 100 can be implemented by the CPU (Central Processing Unit) by executing a given program.

The request extracting unit 101 extracts an access request from the information that is input and output between an application running on the VM 54 and the I/O processor 100. For example, the request extracting unit 101 receives a read request for the data in the recording device. The request extracting unit 101 outputs the received read request to the data reading unit 102. The request extracting unit 101 also receives a write request for the data in the recording device. The request extracting unit 101 outputs the received write request to the data writing unit 103. The read and request requests are exemplary access requests. The access request contains the tag information 2a.

Once the VM 54 is restarted, the request extracting unit 101 receives information representing that the VM 54 has been restarted. The request extracting unit 101 outputs information representing that the VM 54a has been restarted to the index manager 104, which will be described below.

The data reading unit 102 controls reading of data from the recording device 30. For example, the data reading unit 102 receives the read request from the request extracting unit 101. By controlling each of the index manager 104, the tag information manager 106 and the recording device manager 108, the data reading unit 102 outputs the data according to the read request to the application on the VM 54 that has output the read request.

For example, upon receiving the read request from the request extracting unit 101, the data reading unit 102 causes the index manager 104 to access the index information 2e in the memory 52. The data reading unit 102 outputs the read request to the index manager 104 and causes the index manager 104 to determine whether or not the index information 2e corresponding to the read request is stored in the memory 52. The data reading unit 102 performs access control to access the SSD 51 if it is determined that the index information 2e is stored in the memory 52, or to access the recording device 30 if it is determined that the index information 2e is not in the memory 52.

Once accessing the recording device 30, the data reading unit 102 acquires the data according to the read request from the recording device 30 via the recording device manager 108. The data reading unit 102 outputs the acquired data to the application on the VM 54 that has output the read request. The data reading unit 102 outputs the acquired data and the recording device identifier 2b and recording device internal relative position 2c on the acquired data to the tag information manager 106. The data reading unit 102 causes the tag information manager 106 to cache the acquired data in the SSD 51 and store the tag information 2a on the cached data. The data reading unit 102 outputs the tag information 2a on the cached data to the index manager 104. The data reading unit 102 causes the index manager 104 to store, in the memory 52, the index information 2e corresponding to the tag information 2a on the cached data.

Once accessing the SSD 51, the data reading unit 102 outputs the read request to the tag information manager 106 and causes the tag information manager 106 to determine whether or not there is the cached data in the SSD 51. If there is the data cached in the SSD 51, the data reading unit 102 causes the tag information manager 106 to acquire the data according to the read request from the SSD 51. The data reading unit 102 outputs the acquired data to the application on the VM 54 that has output the read request. If there is not the data cached in the SSD 51, the data reading unit 102 causes the recording device manager 108 to acquire the data according to the read request from the recording device 30.

As described above, the data reading unit 102 controls each of the index manager 104, the tag information manager 106, and the recording device manager 108 to output the data according to the read request to the application on the VM 54 that has output the read request.

The data writing unit 103 controls writing of data to the recording device 30. For example, the data writing unit 103 receives a write request from the request extracting unit 101. By controlling each of the index manager 104, the tag information manager 106 and the recording device manager 108, the data writing unit 103 writes the data according to the write request to the recording device 30.

For example, upon receiving the write request from the request extracting unit 101, the data writing unit 103 causes the index manager 104 to access the index information 2e in the memory 52. The data writing unit 103 outputs the write request to the index manager 104 and causes the index manager 104 to determine whether or not the index information 2e corresponding to the write request is stored in the memory 52. The data writing unit 103 performs access control to access the SSD 51 if it is determined that the index information 2e is stored in the memory 52, or to access the recording device 30 if it is determined that the index information 2e is not in the memory 52. Once accessing the recording device 30, the data writing unit 103 writes data to the recording device 30.

Once accessing the SSD 51, the data writing unit 103 outputs the write request to the tag information manager 106 and causes the tag information manager 106 to determine whether or not there is the data cached in the SSD 51. If there is the data cached in the SSD 51, the data writing unit 103 outputs, to the tag information manager 106, information representing that the validity flag 2d of the tag information 2a is to be changed from representing validity to representing invalidity. The data writing unit 103 causes the tag information manager 106 to change the validity flag 2d of the tag information 2a in the SSD 51 from representing validity to representing invalidity. The data writing unit 103 outputs, to the index manager 104, information representing that the validity flag 2d of the index information 2e is to be changed from representing validity to representing invalidity. The data writing unit 103 causes the index manager 104 to change the validity flag 2d of the index information 2e in the memory 52 from representing validity to representing invalidity. If there is not the data cached in the SSD 51, the data writing unit 103 writes the data to the recording device 30.

As described above, the data writing unit 103 controls each of the index manager 104, the tag information manager 106, and the recording device manager 108 to write the data according to the write request to the recording device 30.

The index manager 104 accesses the index information 2e in the memory 52 via the memory access unit 105, which will be described below, and manages the index information 2e. For example, if there is an access request for the data in the recording device 30, the index manager 104 determines whether or not the index information 2e corresponding to the data is stored in the memory 52.

The processing where the index manager 104 receives the access request and determines whether or not the index information 2e corresponding to the access request is stored in the memory 52 will be described here. The processing performed by the index manager 104 upon receiving a read request will be described below. Processing is similarly performed upon receiving a write request.

For example, the index manager 104 receives a read request from the data reading unit 102. The index manager 104 extracts, from the received read request, the recording device identifier 2b and the recording device internal relative position 2c on the data according to the read request. The index manager 104 shortens the recording device identifier 2b and the recording device internal relative position 2c to generate the shortened recording device identifier 2f and the shortened recording device internal relative position 2g. According to one mode, the index manager 104 shortens, with the hash function, each of the recording device identifier 2b and the recording device internal relative position 2c of "TAG A" in the first row in FIG. 3. Accordingly, the index manager 104 generates the shortened recording device identifier 2f and the shortened recording device internal relative position 2g of "INDEX OF TAG A" in the fourth row in FIG. 3. According to another mode, the index manager 104 shortens each of the recording device identifier 2b and the recording device internal relative position 2c of "TAG A" in the first row in FIG. 3 by taking out only the last information of each of the recording device identifier 2b and the recording device internal relative position 2c. Accordingly, the index manager 104 generates the shortened recording device identifier 2f and the shortened recording device internal relative position 2g of "INDEX OF TAG A" of the seventh row in FIG. 3.

If the generated shortened recording device identifier 2f and shortened recording device internal relative position 2g are in the memory 52 and the validity flags 2d corresponding to them are "1", the index manager 104 performs the following processing: the index manager 104 outputs, to the data reading unit 102, the determination result representing that the index information 2e corresponding to the read request is stored in the memory 52.

If the generated shortened recording device identifier 2f and shortened recording device internal relative position 2g are in the memory 52 and the validity flags 2d corresponding to them are "0", the index manager 104 performs the following processing: the index manager 104 outputs, to the data reading unit 102, the determination result representing that the index information 2e corresponding to the read request is not in the memory 52.

If the index information 2e containing the generated shortened recording device identifier 2f and shortened recording device internal relative position 2g is not in the memory 52, the index manager 104 performs the following processing: the index manager 104 outputs, to the data reading unit 102, the determination result representing that the index information 2e corresponding to the read request is not in the memory 52.

As described above, once accepting the read request from the data reading unit 102, the index manager 104 determines whether or not the index information 2e corresponding to the read request is stored in the memory 52 and outputs the determination result to the data reading unit 102. Similarly, once accepting a write request from the data writing unit 103, the index manager 104 determines whether or not the index information 2e corresponding to the write request is stored in the memory 52 and outputs the determination result to the data writing unit 103.

The index manager 104 stores, in the memory 52, the index information 2e corresponding to the tag information 2a on the cached data. For example, the index manager 104 receives the tag information 2a on the cached data from the data reading unit 102. The index manager 104 extracts the recording device identifier 2b and the recording device internal relative position 2c from the received tag information 2a. The index manager 104 shortens the recording device identifier 2b and the recording device internal relative position 2c to generate the shortened recording device identifier 2f and the shortened recording device internal relative position 2g. The index manager 104 stores the generated shortened recording device identifier 2f, the shortened recording device internal relative position 2g, and the validity flag 2d "1" in association to one another in the memory 52 as the index information 2e.

When data is written to the recording device 30, the index manager 104 changes the validity flag 2d of the index information 2e in the memory 52 from representing validity to representing invalidity. For example, the index manager 104 receives information representing that the validity flag 2d of the index information 2e is to be changed from representing validity to representing invalidity. The index manager 104 changes the validity flag 2d of the index information 2e in the memory 52 from representing validity to representing invalidity.

When the VM 54 is restarted, the index manager 104 reconstructs the index information 2e in the memory 52 from the tag information 2a on all entries in the SSD 51. For example, upon receiving information representing that the VM 54a has been restarted from the request extracting unit 101, the index manager 104 acquires the tag information 2a on all the entries stored in the SSD 51a via the memory access unit 105. The index manager 104 shortens the recording device identifier 2b and the recording device internal relative position 2c that are contained in the acquired tag information to generate the shortened recording device identifier 2f and the shortened recording device internal relative position 2g. The index manager 104 stores, in the memory 52 as the index information 2e, the generated shortened recording device identifier 2f and shortened recording device internal relative position 2g and the validity flag 2d in association with the validity flag 2d "1".

The memory access unit 105 accesses the memory 52 according to the processing performed by the index manager 104. For example, when the index manager 104 determines whether or not the index information 2e corresponding to the access request is stored in the memory 52, the memory access unit 105 acquires the index information 2e in the memory 52 and transmits the index information 2e to the index manager 104. When the index manager 104 generates the index information 2e, the memory access unit 105 stores the generated index information 2e in the memory 52.

The tag information manager 106 accesses the tag information 2a in the SSD 51 via the SSD access unit 107, which will be described below, and manages the tag information 2a. For example, the tag information manager 106 receives the access request and determines whether or not there is the tag information 2a corresponding to the access request in the SSD 51.

For example, the tag information manager 106 receives a read request from the data reading unit 102. The tag information manager 106 extracts the recording device identifier 2b and the recording device internal relative position 2c on the data according to the read request from the received read request. If there is the tag information 2a containing the extracted recording device identifier 2b and recording device internal relative position 2c in the SSD 51, the tag information manager 106 acquires the data according to the read request from the SSD 51. The tag information manager 106 outputs the acquired data to the data reading unit 102.

On the other hand, if the tag information 2a containing the extracted recording device identifier 2b and recording device internal relative position 2c is not in the SSD 51, the tag information manager 106 outputs, to the data reading unit 102, the determination result representing that tag information 21 corresponding to the read request is not in the SSD 51.

Furthermore, for example, the tag information manager 106 receives a write request from the data writing unit 103. The tag information manager 106 extracts, from the received write request, the recording device identifier 2b and the recording device internal relative position 2c on the data according to the write request. If the tag information 2a containing the extracted recording device identifier 2b and recording device internal relative position 2c is stored in the SSD 51, the tag information manager 106 executes the following processing: the tag information manager 106 changes the validity flag 2d of the tag information 2a in the SSD 51 from representing validity to representing invalidity and outputs, to the data writing unit 103, the determination result representing that the tag information 2a corresponding to the access request is stored in the SSD 51.

On the other hand, if the tag information 2a containing the extracted recording device identifier 2b and recording device internal relative position 2c is not in the SSD 51, the tag information manager 106 outputs, to the data writing unit 103, a determination result representing that the tag information 2a corresponding to the write request is not in the SSD 51.

As descried above, the tag information manager 106 determines whether or not the tag information 2a corresponding to the access request is stored in the SSD 51 and outputs the determination result to the data reading unit 102 or the data writing unit 103.

Furthermore, the tag information manager 106 caches data in the SSD 51. For example, the tag information manager 106 receives, from the data reading unit 102, the data according to the read request and the recording device identifier 2b and the recording device internal relative position 2c of the data. The tag information manager 106 caches the received data in the SSD 51 and updates the tag information 2a on the cached data.

The SSD access unit 107 accesses the SSD 51 according to the processing performed by the tag information manager 106. For example, when the tag information manager 106 determines whether or not the tag information 2a corresponding to the access request is stored in the SSD 51, the SSD access unit 107 acquires the tag information 2a in the SSD 51 and transmits the tag information 2a to the tag information manager 106. When the tag information manager 106 caches the data, the SSD access unit 107 stores the data to be cached and the tag information 2a in the SSD 51.

The recording device manager 108 manages the data in the recording device 30 via the recording device access unit 109, which will be described below.

For example, the recording device manager 108 receives a read request from the data reading unit 102. The recording device manager 108 extracts, from the received read request, the recording device identifier 2b and the recording device internal relative position 2c of the data according to the read request. The recording device manager 108 accesses the recording device 30 that is identified with the recording device identifier 2b. The recording device manager 108 acquires certain data in the storage location that is identified by the recording device internal relative position 2c in the recording device 30. The recording device manager 108 outputs the acquired data to the data reading unit 102.

The recording device manager 108 receives a write request from the data writing unit 103. The recording device manager 108 extracts, from the received write request, the recording device identifier 2b and the recording device internal relative position 2c of the data according to the write request. The recording device manager 108 accesses the recording device 30 that is identified with the recording device identifier 2b. The recording device manager 108 writes data in the storage location that is identified with the recording device internal relative position 2c in the recording device 30.

The recording device access unit 109 accesses the recording device 30 according to the processing performed by the recording device manager 108. For example, when the recording device manager 108 reads data from the recording device 30, the recording device access unit 109 acquires the data according to the read request from the recording device 30 and transmits the acquired data to the recording device manager 108. Furthermore, when the recording device manager 108 writes data to the recording device 30, the recording device access unit 109 receives the data according to the write request from the recording device manager 108 and writes the data to the recording device 30.

Figure 5:
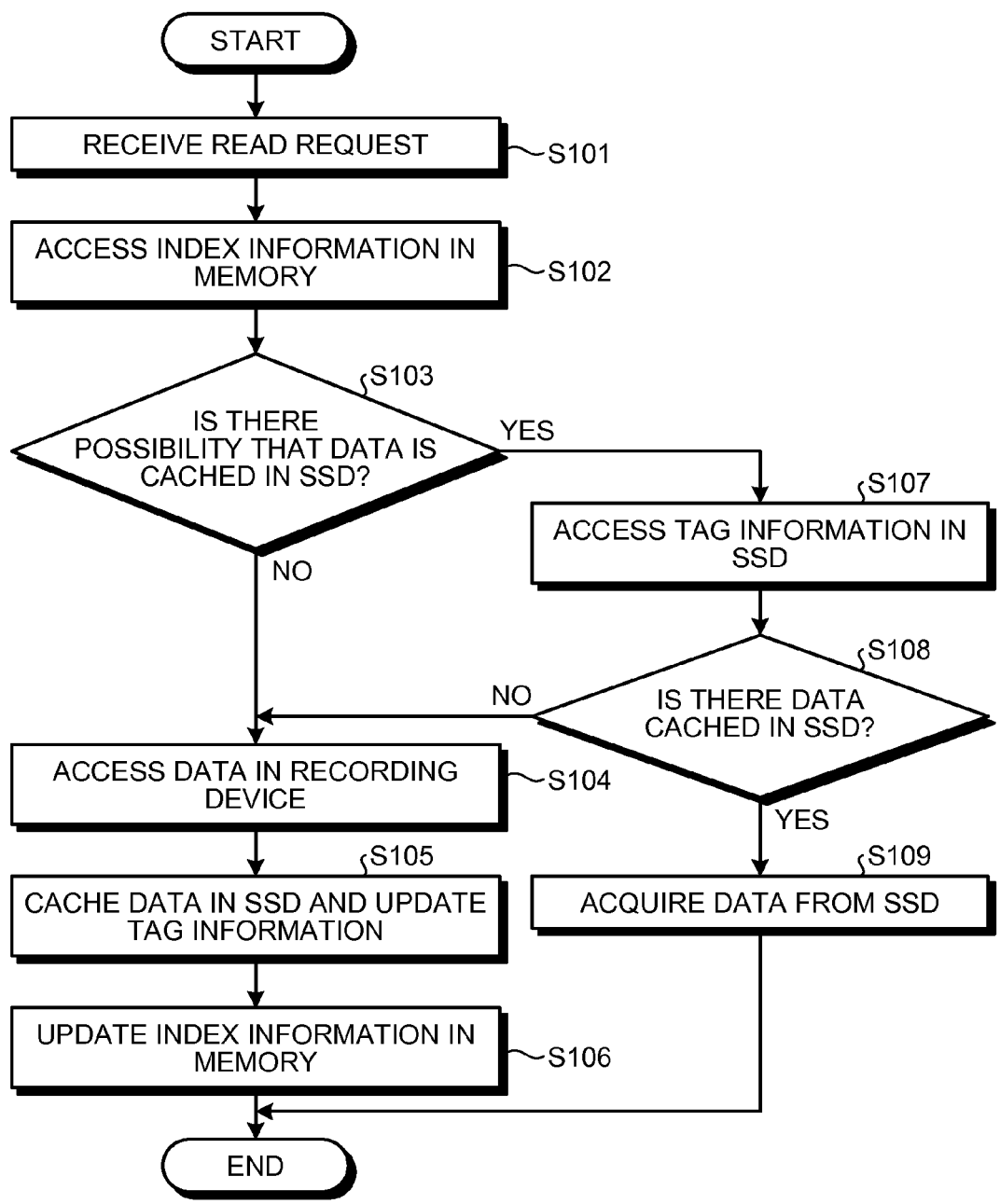
FIG. 5 is a flowchart of a procedure of data read processing according to the first embodiment.

With reference to FIG. 5, a procedure of data read processing according to the first embodiment will be described here. FIG. 5 is a flowchart of the procedure of the data read processing according to the first embodiment. Execution of the processing depicted in FIG. 5 is triggered by, for example, the request extracting unit's reception of a read request from the application running on the VM 54.

The I/O processor 100 receives a read request from an application running on the VM 54 (step S101). The I/O processor 100 accesses the index information in the memory 52 (step S102).

The I/O processor 100 determines whether or not there is a possibility that the data according to the read request is cached in the SSD 51 (step S103). For example, the I/O processor 100 determines whether or not the index information 2e corresponding to the received read request is stored in the memory 52.

If there is no possibility that the data according to the read request is cached in the SSD 51 (NO at step S103), the I/O processor 100 accesses the data in the recording device 30 (step S104). For example, the I/O processor 100 acquires the data according to the read request from the recording device 30 and outputs the data to the application on the VM 54.

The I/O processor 100 caches the data acquired from the recording device 30 in the SSD 51 and updates the tag information 2a (step S105). The I/O processor 100 updates the index information 2e in the memory 52 (step S106) and ends the processing.

On the other hand, if there is a possibility that the data according to the read request is cached in the SSD (YES at step S103), the I/O processor 100 accesses the tag information 2a on the SSD 51 (step S107).

The I/O processor 100 determines whether or not there is the data cached in the SSD 51 (step S108). When there is the data cached in the SSD 51 (YES at step S108), the I/O processor 100 acquires the data according to the read request from the SSD 51 (step S109) and ends the processing. For example, the I/O processor 100 acquires the data according to the read request from the SSD 51 and outputs the data to the application running on the VM 54.

On the other hand, when there is not the data cached in the SSD 51 (NO at step S108), the I/O processor 100 moves to the processing at step S104.

Figure 6:
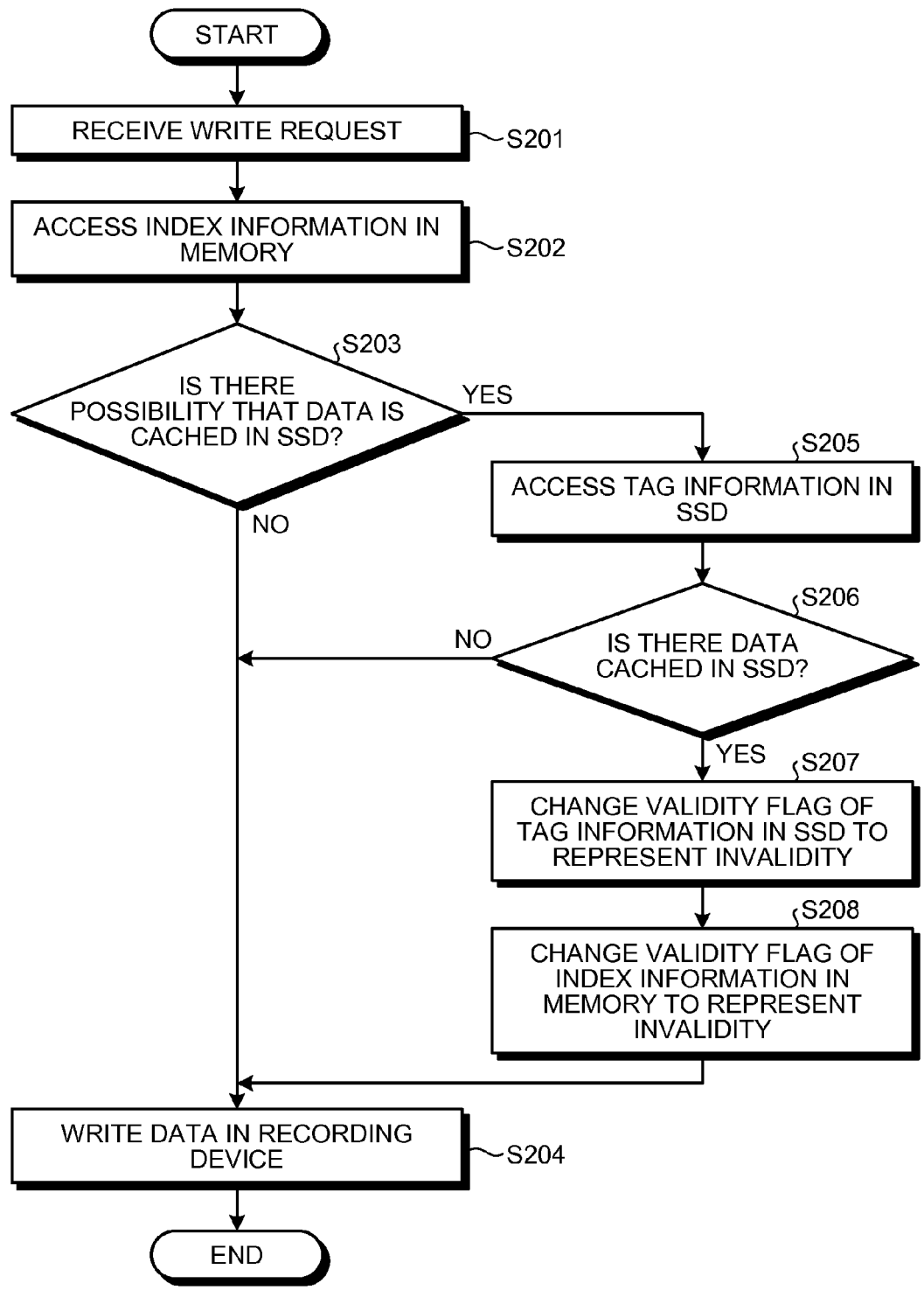
FIG. 6 is a flowchart of a procedure of data write processing according to the first embodiment.

With reference to FIG. 6, the procedure of data write processing according to the first embodiment will be described. FIG. 6 is a flowchart of the procedure of the data write processing according to the first embodiment. Execution of the processing depicted in FIG. 6 is triggered by, for example, the request extracting unit's reception of a write request for the data in the recording device 30 from the application running on the VM 54.

The I/O processor 100 receives a write request from the application running on the VM 54 (step S201). The I/O processor 100 accesses the index information in the memory 52 (step S202).

The I/O processor 100 determines whether there is a possibility that the data according to the write request is cached in the SSD 51 (step S203). For example, the I/O processor 100 determines whether or not the index information 2e corresponding to the received read request is stored in the memory 52.

If there is no possibility that the data according to the write request is cached in the SSD 51 (NO at step S203), the I/O processor 100 writes the data in the recording device 30 (step S204) and ends the processing.

On the other hand, If there is a possibility that the data according to the write request is cached in the SSD 51 (YES at step S203), the I/O processor 100 accesses the tag information in the SSD 51 (step S205).

The I/O processor 100 determines whether there is the data cached in the SSD 51 (step S206). When there is the data cached in the SSD 51 (YES at step S206), the I/O processor 100 changes the validity flag of the tag information on the data according to the write request such that invalidity is represented (step S207). The I/O processor 100 then changes the validity flag of the index information on the data according to the write request such that invalidity is represented (step S208) and moves to step S204.

On the other hand, when there is not the data cached in the SSD 51 (NO at step S206), the I/O processor 100 moves to the processing at step S204.

Figure 7:
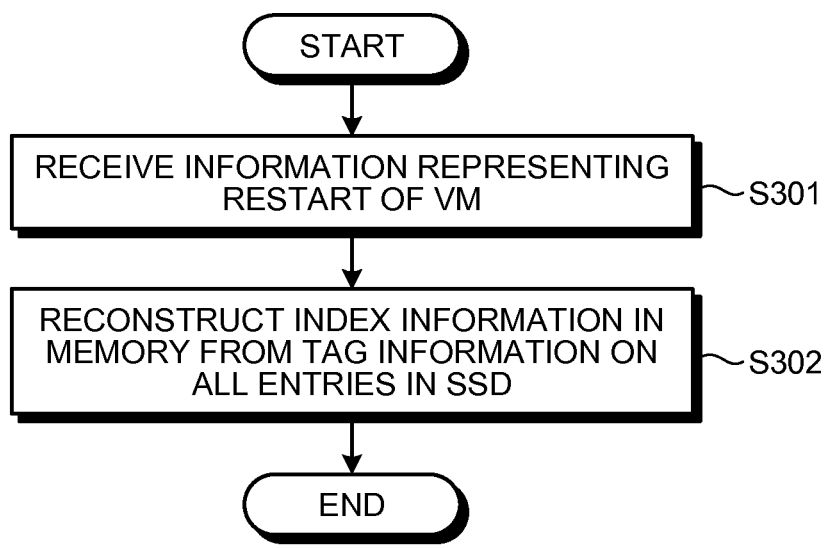
FIG. 7 is a flowchart of a procedure of reconstruction processing according to the first embodiment.

With reference to FIG. 7, a procedure of reconstruction processing according to the first embodiment will be described here. FIG. 7 is a flowchart of the procedure of the reconstruction processing according to the first embodiment. Execution of the processing depicted in FIG. 7 is triggered by, for example, the request extracting unit's reception of information representing restart of the VM 54.

The I/O processor 100 receives information representing the restart of the VM 54 (step S301). The I/O processor 100 reconstructs the index information in the memory 52 from the tag information 2a on all entries in the SSD 51 (step S302) and ends the processing. For example, upon receiving information representing that the VM 54a has been restarted from the request extracting unit 101, the I/O processor 100a acquires the tag information 2a on all entries stored in the SSD 51a. The I/O processor 100a shortens the recording device identifier 2b and the recording device internal relative position 2c contained in the acquired tag information 2a to generate the shortened recording device identifier 2f and the shortened recording device internal relative position 2g. The I/O processor 100a then stores the generated shortened recording device identifier 2f and shortened recording device internal relative position 2g and the validity flag 2d in association with one another as the index information 2e in the memory 52.

The effects from the I/O processor 100 according to the first embodiment will be described here. The I/O processor 100 receives an access request for data. The I/O processor 100 determines whether or not the index information corresponding to the received access request is stored in the memory. The I/O processor 100 performs access control to access the non-volatile memory upon determining that the index information is stored in the memory, and to access the recording device upon determining that the index information is not in the memory. Accordingly, the I/O processor 100 can increase the accessibility while reducing the memory utilization.

For example, the I/O processor 100 stores, in the memory 52, the index information 2e obtained by shortening the tag information 2a that identifies the data from the recording device 30 cached in the SSD 51. Thus, the I/O processor 100 can reduce the memory utilization.

Furthermore, for example, if the data according to the access request is not in the SSD 51, the I/O processor 100 reduces the number of accesses to the SSD 51, which increases the accessibility. For example, in the related technology, an accesses to the SSD 51 is made each time an access request is received even if the data according to the access request is not in the SSD 51. On the other hand, the I/O processor 100 determines whether or not the index information 2e corresponding to the access request is stored in the memory 52. When the index information 2e is not in the memory 52, the I/O processor 100 determines that the data according to the access request is not in the SSD 51 and accesses the recording device 30 without accessing the SSD 51. Accordingly, the I/O processor 100 can reduce the number of accesses to the SSD 51, which increases the accessibility.

For example, based on the tag information 2a on the data from the recording device 30 cached in the SSD 51, the I/O processor 100 generates the index information 2e. Accordingly, when the memory 52 is rest, the I/O processor 100 can generate the index information 2e easily.

[b] Second Embodiment

In the first embodiment, for example, when different two sets of tag information 2a are shortened, the sets of index information 2e may be the same information due to, for example, a collision of hash values. In the example depicted in FIG. 3, the index information 2e of "INDEX OF TAG A", which is obtained by shortening "TAG A" by taking out only the last information, and the index information 2e of "INDEX OF TAG C", which is obtained by shortening "TAG C" by taking out only the last information, are the same. In this case, there is a risk that a hit error would occur, i.e., although it is determined that the index information 2e in the memory 52 matches, there is not the data cached in the SSD 51 (NO at step S108). Furthermore, if access requests for these different sets of tag information 2a occur alternately, the cache in the SSD 51 is alternately re-written and furthermore the number of hit errors increases.

Thus, for the second embodiment, a case will be described where data according to the tag information 2a for which many hit errors have occurred is stored in an overflow area in the memory 52. For the second embodiment, components different from those of the first embodiment will be described and the same components as those of the first embodiments are denoted with the same reference numerals as those of the first embodiment, and description thereof will not be provided.

Figure 8:
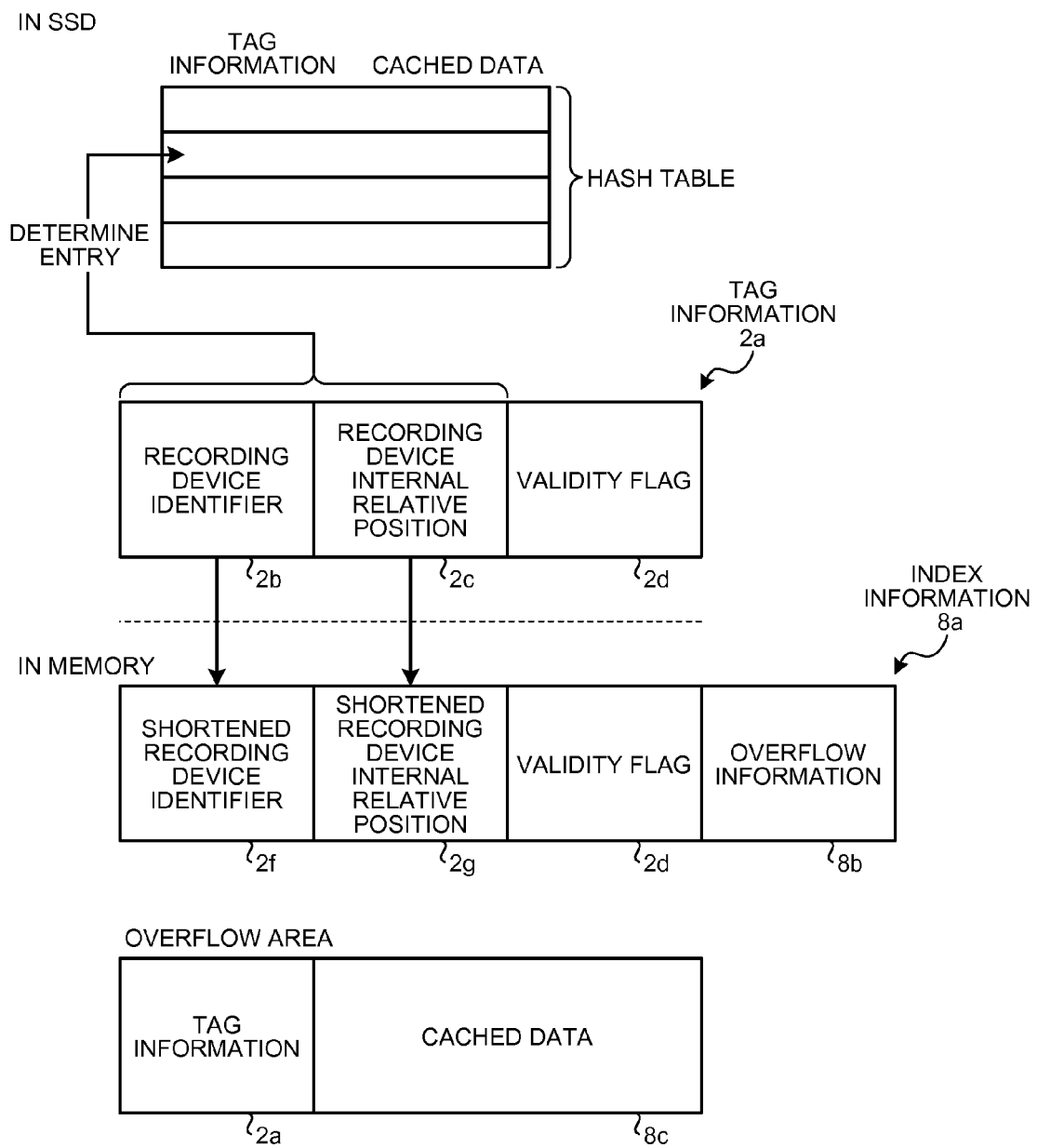
FIG. 8 is a diagram to describe exemplary tag information and index information according to a second embodiment.

With reference to FIG. 8, exemplary tag information and index information according to the second embodiment will be described. FIG. 8 is a diagram to describe the exemplary tag information and index information according to the second embodiment.

As depicted in FIG. 8, index information 8a that is stored in the memory 52 contains the shortened recording device identifier 2f, the shortened recording device internal relative position 2g, the validity flag 2d, and overflow information 8b. The overflow information 8b is information representing whether or not the data identified by the tag information 2a is in the overflow area of the memory 52. For example, "1" is stored in the overflow information 8b if the data is in the overflow area and "0" is stored if the data not in the overflow area.

Furthermore, as depicted in FIG. 8, information where the tag information 2a and cached data 8c are associated is stored in the overflow area in the memory 52. The cached data 8c represents the data that is cached in the overflow area. The tag information 2a is the same as that of the above-described embodiment and accordingly descriptions thereof will not be given here.

Exemplary functional configuration of an information processing system according to a second embodiment will be described here. The information processing system according to the second embodiment has the same functional configuration as that of the information processing system depicted in FIG. 1.

The memory 52 further stores history information. The history information is information for recording hit errors. For example, the history information is updated by the index manager 104 when the tag information manager 106 outputs a determination result representing that the tag information 2a corresponding to the read request is not in the SSD 51. The index manager 104 refers to the history information.

With reference to FIGS. 9 and 10, exemplary history information according to the second embodiment will be described here. FIGS. 9 and 10 are tables to describe exemplary the history information according to the second embodiment. The history information depicted in FIGS. 9 and 10 is stored in the memory 52.

As the first row in FIG. 9 represents, the history information contains the total length and the last pointer. The total length is information representing the total length of the history information. The last pointer is information representing the position of a pointer upon registration of information in the history information for the last time. As the second and the following rows represent, the history information contains information where the time, recording device identifier and recording device internal relative position are associated. The time is information representing the time at which the corresponding entry is registered.

FIG. 10 illustrates information that is stored as history information. As the first row in FIG. 10 represents, the history information contains the total length "2048" and the last pointer "1024". As the second row in FIG. 10 represents, the history information contains the time "2012030108510318", the recording device identifier "abE0a1-5dPX-ITpk-4AmA-azC2-4zzC-OmOcLX", and the recording device internal relative position "1357246864". The recording device identifier "abE0a1-5dPX-ITpk-4AmA-azC2-4zzC-OmOcLX" and the recording device internal relative position "1357246864" correspond to the tag information 2a "TAG A" depicted in FIG. 3. In other words, the second row depicted in FIG. 10 represents that, at the time "2012030108510318", it was determined that the data according to the tag A is not in the SSD 51, i.e., there was a hit error of TAG A. In the second and the following rows in FIG. 10, sets of tag information 2a for which hit errors occurred are stored chronologically. If information is stored in all entries of the history information, the history information is sequentially updated from the oldest entry.

Figure 11:
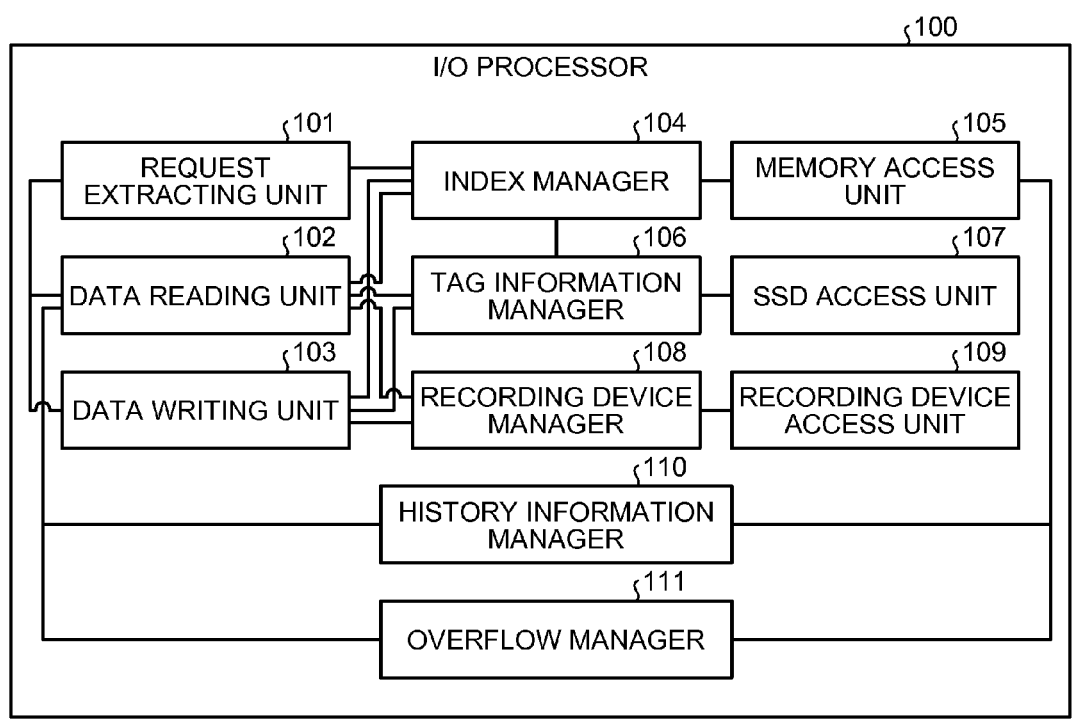
FIG. 11 is a block diagram of an exemplary functional configuration of an I/O processor according to the second embodiment.

With reference to FIG. 11, an exemplary functional configuration of the I/O processor 100 according to the second embodiment will be described. FIG. 11 is a block diagram of an exemplary functional configuration of the I/O processor 100 according to the second embodiment. As depicted in FIG. 11, the I/O processor 100 according to the second embodiment further includes history information manager 110 and an overflow manager 111.

The data reading unit 102 further determines whether or not the data corresponding to the access request is stored in the memory 52. For example, upon receiving a read request from the request extracting unit 101, the data reading unit 102 causes the index manager 104 to access the index information 2e in the memory 52. The data reading unit 102 outputs the read request to the index manager 104 and causes the index manager 104 to determine whether or not the data according to the read request is in the overflow area. If it is determined that the data according to the read request is in the overflow area, the data reading unit 102 causes the index manager 104 to access the cached data in the overflow area via the overflow manager 111, which will be described below. The data reading unit 102 acquires the data according to the read request from the overflow area via the overflow manager 111. The data reading unit 102 outputs the acquired data to the application running on the VM 54.

On the other hand, if it is determined that the data according to the read request is in the overflow area, the data reading unit 102 causes the index manager 104 to determine whether or not the corresponding SSD entry is valid. The data reading unit 102 performs access control to access the SSD 51 if it is determined that the data corresponding to the read request is stored in the memory 52, and accesses the recording device 3 if it is determined that the data corresponding to the read request is not in the memory 52.

Once accessing the recording device 30, the data reading unit 102 acquires the data according to the read request from the recording device 30 via the recording device manager 108. The data reading unit 102 outputs the acquired data to the application on the VM 54 that has output the read request. The data reading unit 102 outputs the acquired data, the recording device identifier 2b and the recording device internal relative position 2c of the data to the tag information manager 106. The data reading unit 102 causes the tag information manager 106 to cache the acquired data in the SSD 51 and store the tag information 2a of the cached data. The data reading unit 102 outputs the tag information 2a of the cached data to the index manager 104. The data reading unit 102 causes the index manager 104 to store, in the memory 52, the index information 2e corresponding to the tag information 2a of the cached data.

Once accessing the SSD 51, the data reading unit 102 outputs the read request to the tag information manager 106 and causes the tag information manager 106 to determine whether or not there is the data cached in the SSD 51. If there is the cached data in the SSD 51, the tag information manager 106 is caused to acquire the data according to the read request from the SSD 51. The data reading unit 102 outputs the acquired data to the application on the VM 54 that has output the read request.

On the other hand, if there is not the data cached in the SSD 51, the data reading unit 102 causes the history information manager 110 to update the history information. The data reading unit 102 outputs, the time at which it was determined that there is not the data cached in the SSD 51 and the tag information 2a to the history information manager 110. The data reading unit 102 causes the history information manager 110 to store the time at which it was determined that there is not the data cached in the history SSD 51 and the tag information in the history information in the memory 52.

The data reading unit 102 causes the history information manager 110 to determine whether or not the frequency of hit errors is equal to a given frequency or higher according to the history information. If the history information manager 110 determines that the frequency of hit errors is lower than the given frequency, the data reading unit 102 performs access control to access the recording device 30.

On the other hand, if the history information manager 110 determines that the frequency of similar hit errors is equal to the given frequency or higher, the data reading unit 102 causes the overflow manager 111 to cache the data in the recording device 30 in the overflow area. For example, the data reading unit 102 causes the recording device manager 108 to acquire the data according to the read request from the recording device 30. The data reading unit 102 causes the acquired data to be cached in the overflow area in the memory 52 in association with the tag information 2a.

As described above, the data reading unit 102 controls each of the index manager 104, the tag information manager 106, the recording device manager 108, the history information manager 110, and the overflow manager 111. Accordingly, the data reading unit 102 outputs the data according to the read request to the application on the VM 54 that has output the read request.

Furthermore, upon receiving the read request from the data reading unit 102, the index manager 104 determines whether or not the data according to the read request is in the overflow area. For example, if the index information 2e corresponding to the read request is stored in the memory 52 and the overflow information 8b of the index information 2e is "1", the index manager 104 determines that the data is in the overflow area. If the index information 2e corresponding to the read request is not in the memory 52, or the overflow information 8b of the corresponding index information 2e is "0", the index manager 104 determines that the data is not in the overflow area. The index manager 104 outputs the determination result to the data reading unit 102.

The index manager 104 determines whether or not the corresponding SSD entry is valid. For example, the index manager 104 determines that the SSD entry is valid if the validity flag 2d of the index information 2e according to the read request is "1", and determines that the SSD entry is invalid if the validity flag 2d is "0".

The history information manager 110 accesses the history information in the memory 52 via the memory access unit 105 and manages the history information.

If the index manager 104 determines that the data according to the read request is not in the SSD 51, the history information manager 110 records the history of the tag information 2a according to the read request in the memory 52. For example, the history information manager 110 receives the time at which it was determined that there is not the data cached in the SSD 51 and the tag information 2a from the index manager 104. The history information manager 110 stores the time at which it was determined that there is not the data cached in the SSD 51 and the tag information 2a in association with each other in the history information in the memory 52.

The history information manager 110 determines whether or not the frequency of similar hit errors is equal to a given frequency or higher according to the history information. For example, the history information manager 110 refers to the history information and determines that the frequency of hit errors is equal to the given frequency or higher if the number of entries of the same tag information 2a is equal to a given number or more within a given time, and determines that the frequency of hit errors is lower than the given frequency if the number of entries of the same tag information 2a is lower than the given number. The history information manager 110 then outputs the determination result to the data reading unit 102.

According to the example depicted in FIG. 10, the history information represents that there was a hit error of TAG C at the time "2012030108511205". The history information also represents that there was a hit error of TAG C at the time "2012030108512836". Furthermore, the history information represents that there was a hit error of TAG C at the time "2012030108514001". In this case, because there were the same three entries between the time "2012030108511205" and the time "2012030108514001", the history information manager 110 determines that there are hit errors at the given frequency or higher. The given time and the given number are an example only. They may be arbitrarily set by a person who manages the information processing system.

The overflow manager 111 accesses the overflow area in the memory 52 via the memory access unit 105 and manages the information stored in the overflow area.

If the frequency in which the history information manager 110 stores the tag information in the history information is equal to the given frequency or higher, the overflow manager 111 stores the data corresponding to the tag information 2a in the memory 52. For example, the overflow manager 111 receives the data according to the read request from the data writing unit 103. The overflow manager 111 caches the received data in association with the tag information 2a in the overflow area in the memory 52.

Furthermore, for example, when the data is in the overflow area, the overflow manager 111 accesses the cached data in the overflow area. For example, if it is determined that the data according to the read request is in the overflow area, the overflow manager 111 receives the read request from the data reading unit 102. The overflow manager 111 acquires the data according to the received read request from the overflow area and outputs the acquired data to the data reading unit 102.

Figure 12:
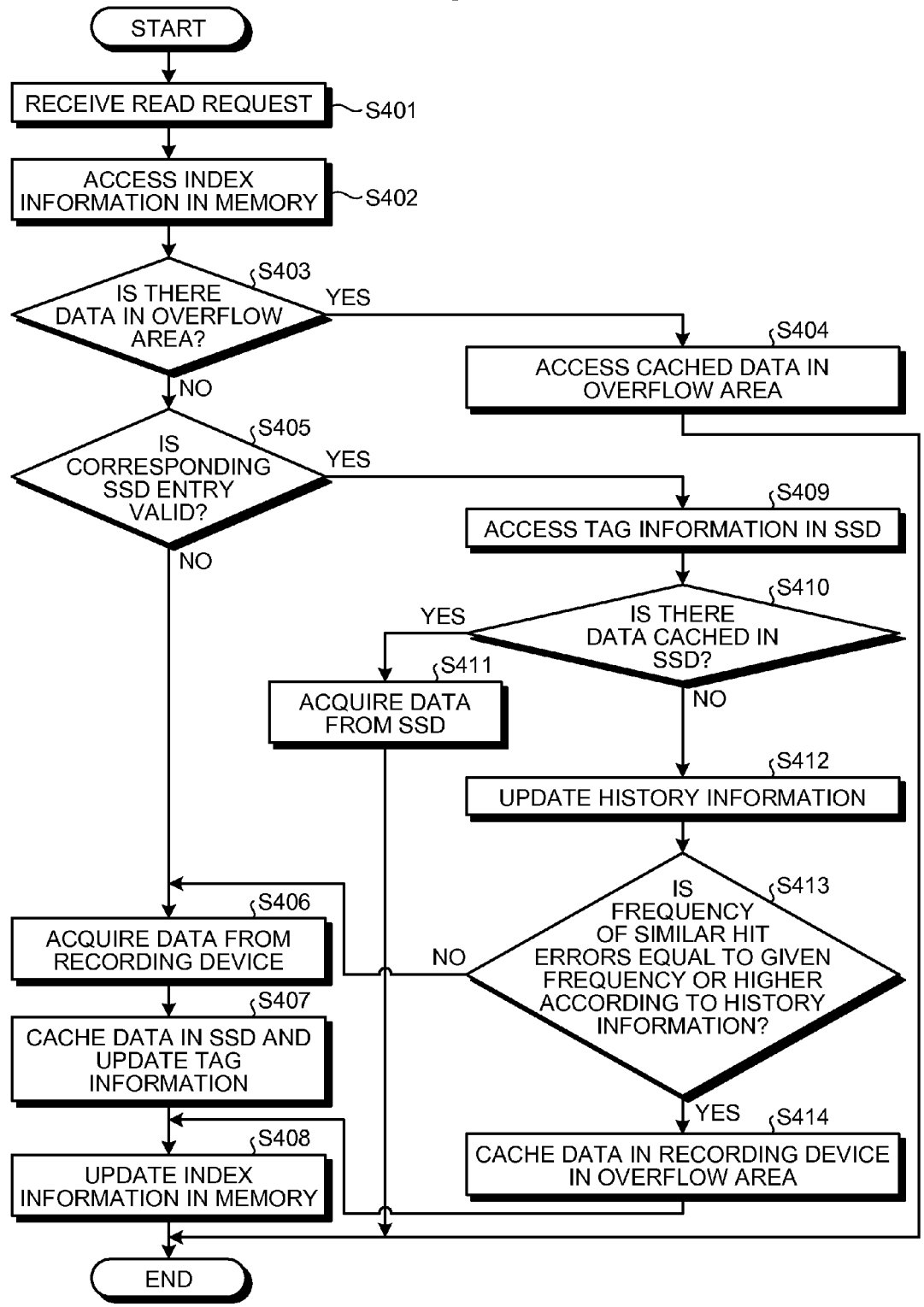
FIG. 12 is a flowchart of a procedure of data read processing according to the second embodiment.

With reference to FIG. 12, the procedure of the data read processing according to the second embodiment will be described here. FIG. 12 is a flowchart of the procedure of the data read processing according to the second embodiment. Execution of the processing depicted in FIG. 12 is triggered by, for example, the request extracting unit's reception of a read request from the application running on the VM 54.

The I/O processor 100 receives a read request from the application running on the VM 54 (step S401). The I/O processor 100 accesses the index information in the memory 52 (step S402).

The I/O processor 100 determines whether or not the data according to the read request is in the overflow area (step S403). For example, if the index information 2e corresponding to the received read request is stored in the memory 52 and if the overflow information 8b of the corresponding index information 2e is "1", the I/O processor 100 determines that there is the data in the overflow area. If the index information 8a corresponding to the received read request is not in the memory 52 or if the overflow information 8b of the corresponding index information 8a is "0", the I/O processor 100 determines that there is not the data in the overflow area.

If the data is in the overflow area (YES at step S403), the I/O processor 100 accesses the cached data in the overflow area (step S404) and ends the processing. For example, the I/O processor 100 acquires the data according to the read request from the overflow area and outputs the data to the application running on the VM 54.

On the other hand, if the data is not in the overflow area (NO at step S403), the I/O processor 100 determines whether or not the corresponding SSD entry is valid (step S405). For example, if the corresponding validity flag 2d is "1", the I/O processor 100 determines that the SSD entry is valid. If the corresponding validity flag 2d is "0", the I/O processor 100 determines that the SSD entry is invalid.

If the SSD entry is invalid (NO at step S405), the I/O processor 100 acquires the data from the recording device 30 (step S406). For example, the I/O processor 100 acquires the data according to the read request from the recording device 30 and outputs the data to the application on the VM 54.

The I/O processor 100 caches the data, which is acquired from the recording device, in the SSD 51 and stores the tag information 2a (step S407). The I/O processor 100 stores the index information 8a in the memory 52 (step S408) and ends the processing.

On the other hand, if the SSD entry is valid (YES at step S405), the I/O processor 100 accesses the tag information 2a in the SSD 51 (step S409).

The I/O processor 100 determines whether or not there is the data cached in the SSD 51 (step S410). If there is the data cached in the SSD 51 (YES at step S410), the I/O processor 100 acquires the data according to the read request from the SSD 51 and outputs the data to the application running on the VM 54.

On the other hand, if there is not the data cached in the SSD 51 (NO at step S410), the I/O processor 100 updates the history information (step S412). For example, the I/O processor 100 stores, in the history information, the time at which it was determined that there is not the data cached in the SSD 51 and the tag information 2a in association with each other.

The I/O processor 100 determines whether or not the frequency of similar hit errors is equal to the given frequency or higher according to the history information (step S413). For example, the I/O processor 100 refers to the history information, determines that the frequency of hit errors is equal to the given frequency or higher if the number of entries of the same tag information 2a as the stored tag information 2a is equal to the given number or larger, and determines that the frequency of hit errors is lower than the given frequency if the number of entries of the same tag information 2a is smaller than the given number.

If the frequency of hit errors is equal to the given frequency or higher (YES at step S413), the I/O processor 100 caches, in the overflow area, the data in the recording device 30 (step S414) and moves to the processing at step S408. For example, the I/O processor 100 acquires the data according to the read request from the recording device 30 and caches the acquired data in association with the tag information 2a in the overflow area in the memory 52.

On the other hand, if the frequency of hit errors is lower than the given frequency (NO at step S413), the I/O processor 100 moves to the processing at step S406.

The effects from the I/O processor 100 according to the second embodiment will be described here. When it is determined that the tag information 2a is not in the SSD 51, the I/O processor 100 records the history of the tag information 2a in the history information in the memory 52. When the frequency in which the tag information 2a is recorded in the history information is equal to the given frequency or higher, the I/O processor 100 stores the data according to the tag information 2a in the overflow area in the memory 52. The I/O processor determines whether or not the data corresponding to the received access request is in the overflow area in the memory 52. When it is determined that the data corresponding to the received access request is in the overflow area in the memory 52, the I/O processor performs access control to access the memory 52. When it is determined that the index information 8a is stored in the memory 52, the I/O processor 100 performs access control to access the SSD 51. Accordingly, even if access requests for the two different sets of tag information 2a occur alternately, the I/O processor 100 can reduce frequent accesses to the SSD and hit errors due to frequent rewriting of the cache in the SSD 51.

For example, when two different sets of tag information 2a become the same index information 8a when they are shortened, the I/O processor 100 stores the data according to one of the sets of tag information 2a in the overflow area. Accordingly, the I/O processor 100 can cache the data according to the two different sets of tag information 2a independently. For this reason, the I/O processor 100 can deal with a case where different sets of tag information 2a become the same index information 8a when they are shortened.

[c] Third Embodiment

The above-described embodiment can be applied to a case where, version information is managed in order to prevent old-version data from being updated by the recording device 30. For a third Embodiment, a case will be described where the I/O processor 100 manages the version information. For the third embodiment, components different from those of the first embodiment will be described and the same components as those of the first embodiment as those of the first embodiments are denoted with the same reference numerals as those of the first embodiment, and description thereof will not be provided.

An exemplary functional configuration of an information processing system according to a third embodiment. The information processing system according to the third embodiment has the same functional configuration as that of the information processing system depicted in FIG. 1.

Figure 13:
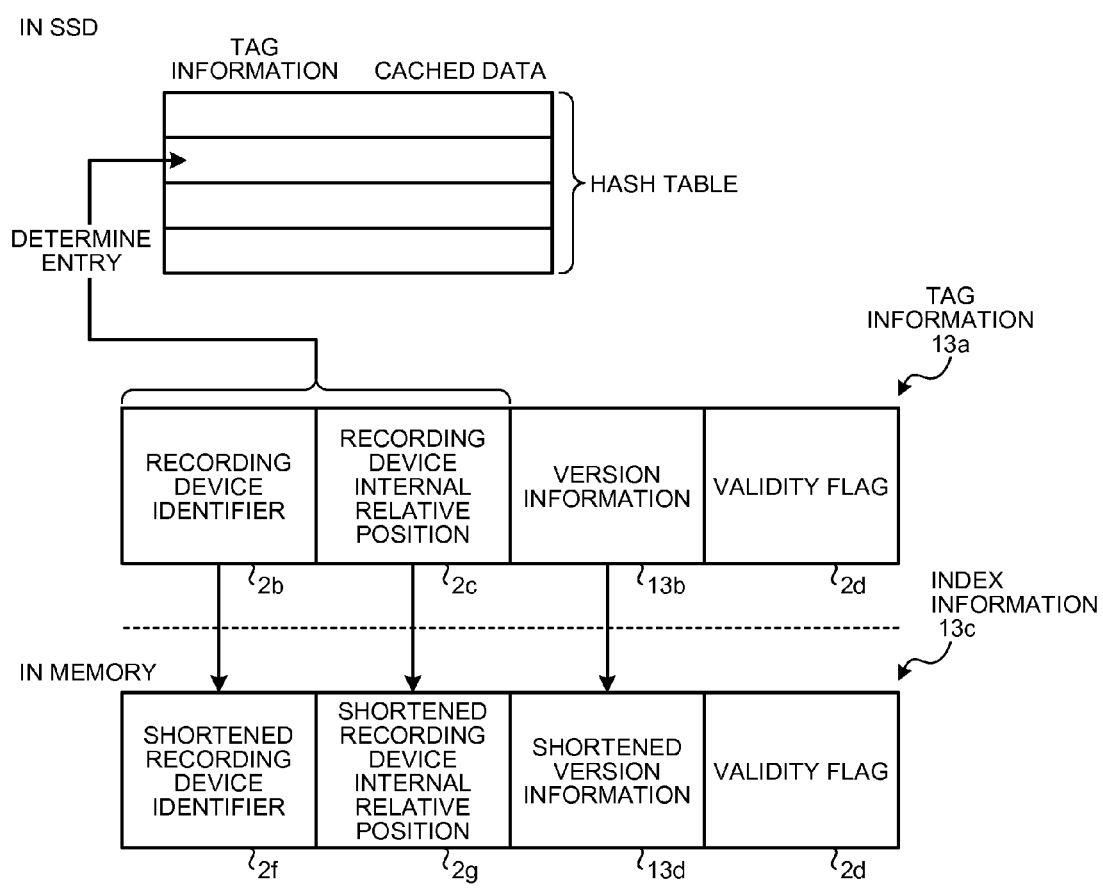
FIG. 13 is a diagram to describe exemplary tag information and index information according to a third embodiment.

Exemplary tag information and index information according to the third embodiment will be described with reference to FIG. 13. FIG. 13 is a diagram to describe the exemplary tag information and index information according to the third embodiment.

As depicted in FIG. 13, tag information 13a stored in the SSD 51 contains the recording device identifier 2b, the recording device internal relative position 2c, version information 13b, and the validity flag 2d. The version information 13b is information representing the version of the data that is stored in the recording device 30. For example, the version information 13b is represented by the number of times for which the data in the recording device 30 is updated. The version information 13b is stored also in the recording device 30.

Index information 13c stored in the memory 52 contains the shortened recording device identifier 2f, the shortened recording device internal relative position 2g, shortened version information 13d, and the validity flag 2d. The shortened version information 13d is information obtained by shortening the version information 13b with a hash function. The version information 13b is shortened by the index manager 104. The version information 13b may be shortened by taking out only the last information of the version information 13b.

For example, if the version information 13b "1023" is shortened by a hash function, it becomes the shortened version information 13d "ce5140df15d046a66883807d18d0264b" is obtained. If the version information 13b "1023" is shortened by taking out the last information thereof, it becomes the shortened version information 13d "23". The shortening into the shortened version information 13d is performed by the index manager 104.

An exemplary functional configuration of the I/O processor 100 according to the third embodiment will be described here. The I/O processor 100 according to the third embodiment has the same functional configuration as that of the I/O processor 100 depicted in FIG. 4.

The request extracting unit 101 receives information representing that the recording device 30 has been mounted on the VM 54. For example, when the VM 54 is started, the request extracting unit 101 receives information representing that a VDISK 32 in which the data to be processed by the VM 54 is stored has been mounted. Once the VDISK 32 is mounted, the request extracting unit 101 outputs information representing that the recording device 30 has been mounted on the VM 54 to the recording device manager 108.

When accessing the recording device 30 to acquire the data according to the read request from the recording device 30 via the recording device manager 108, the data reading unit 102 further updates the version information 13b in the SSD 51 and the shortened version information 13d in the memory 52 to the latest ones. For example, when caching the data acquired from the recording device 30 in the SSD 51 and updating the tag information 2a, the data reading unit 102 updates the version information 13b in the SSD 51 to the version information 13b acquired from the recording device 30. Furthermore, for example, when updating the index information 13c in the memory 52, the data reading unit 102 updates the shortened version information 13d in the memory 52 by using the version information 13b acquired from the recording device 30. For example, the data reading unit 102 causes the index manager 104 to shorten the version information 13b acquired from the recording device 30 to generate the shortened version information 13d. The data reading unit 102 then causes the index manager 104 to update the shortened version information 13d in the memory 52 to the generated shortened version information 13d.

The data reading unit 102 accesses the SSD 51 and, if there is the data cached in the SSD 51, further outputs the read request to the tag information manager 106 to cause the tag information manager 106 to determine whether or not the version information in the SSD 51 is the latest one. If the version information 13b in the SSD 51 is the latest one, the data reading unit 102 causes the tag information manager 106 to acquire the data according to the read request from the SSD 51. The data reading unit 102 outputs the acquired data to the application in the VM 54 that has output the read request. If the version information 13b in the SSD 51 is not the latest one, the data reading unit 102 causes the recording device manager 108 to acquire the data according to the read request from the recording device 30.

The recording device manager 108 further updates the version information stored in the recording device 30. For example, the recording device manager 108 receives, from the request extracting unit 101, information representing that the recording device 30 has been mounted on the VM 54. The recording device manager 108 increments the version information 13b on the data in the VDISK 32 in which the data to be processed by the VM 54 is stored.

Figure 14:
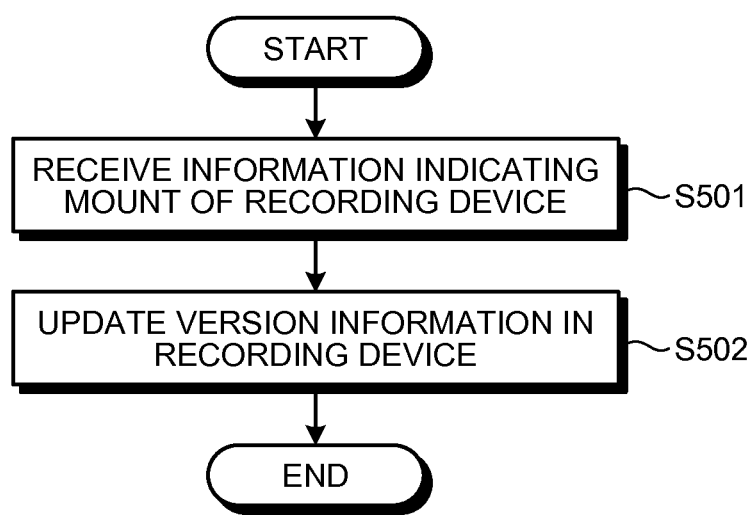
FIG. 14 is a flowchart of a procedure of processing for updating version information according to the third embodiment.

With reference to FIG. 14, the procedure of processing for updating the version information according to the third embodiment will be described here. FIG. 14 is a flowchart representing the procedure of the processing for updating version information according to the third embodiment. Execution of the processing depicted in FIG. 14 is triggered by, for example, the request extracting unit's reception of information representing that the recording device 30 has been mounted.

The I/O processor 100 receives information representing that the recording device 30 has been mounted on the VM 54 (step S501). The I/O processor 100 updates the version information 13b in the recording device 30 (step S502) and ends the processing.

In the above-described case, updating of all the version information 13b stored in the recording device is triggered by reception, by the I/O processor 100, of the information representing that the recording device 30 has been mounted on the VM 54; however, the present invention is not limited to this. For example, the I/O processor 100 may update the version information on the corresponding data each time data is written. For example, when performing the processing at step S204 in FIG. 6, the I/O processor 100 increments the version information 13b on the data corresponding to the written data.

Figure 15:
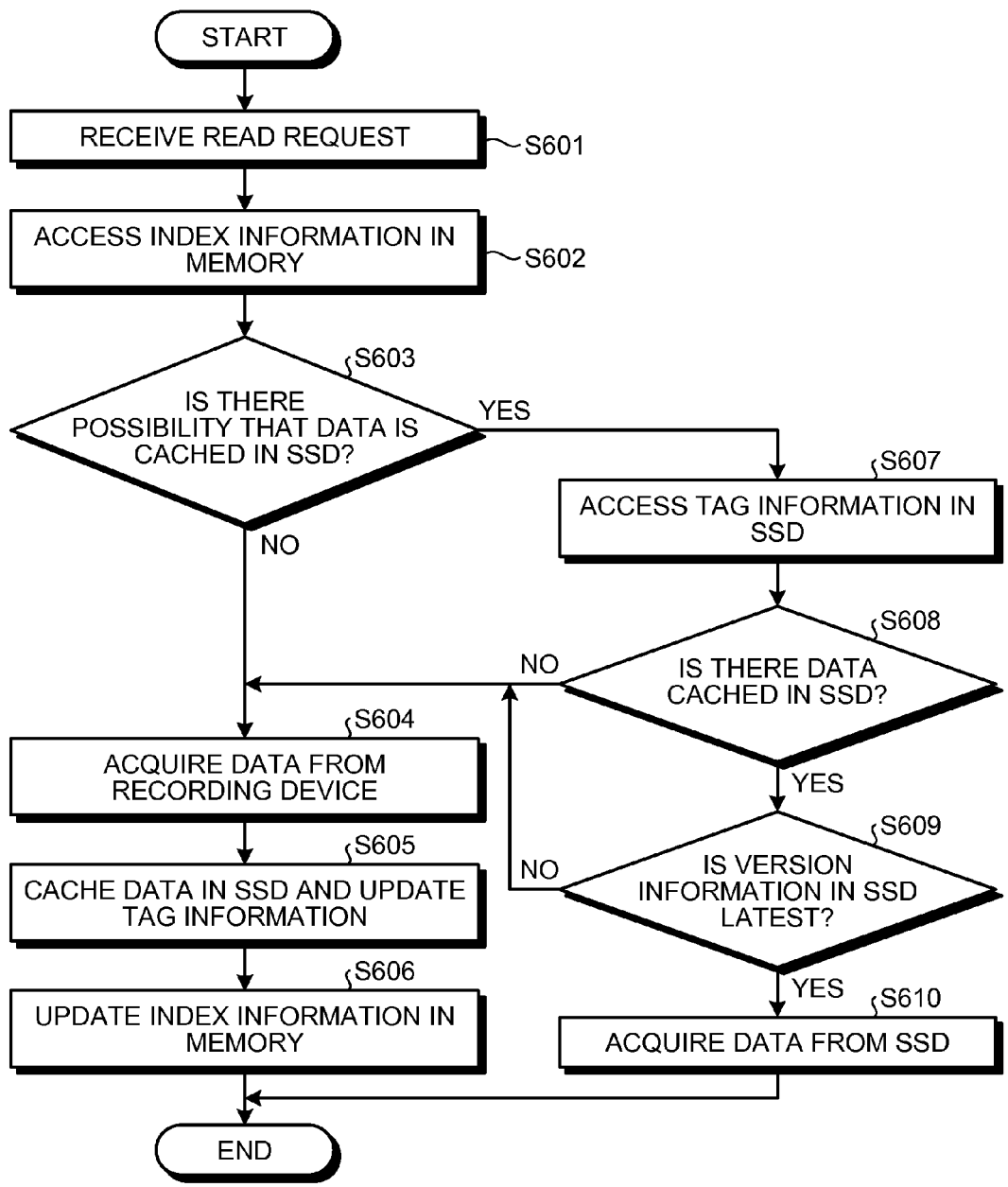
FIG. 15 is a flowchart of a procedure of data read processing according to the third embodiment.

With reference to FIG. 15, the procedure of the data read processing according to the third embodiment will be described here. FIG. 15 is a flowchart of the procedure of the data read processing according to the third embodiment. Execution of the processing depicted in FIG. 15 is triggered by, for example, the request extracting unit's reception of a read request from the application running on the VM 54.

The I/O processor 100 receives a read request from the application running on the VM 54 (step S601). The I/O processor 100 accesses the index information in the memory 52 (step S602).

The I/O processor 100 determines whether or not the data according to the read request is cached in the SSD (step S603). For example, the I/O processor 100 determines whether or not the index information 13c corresponding to the received read request is stored in the memory 52.

If there is no possibility that the data according to the read request is cached in the SSD 51 (NO at step S603), the I/O processor 100 accesses the data in the recording device 30 (step S604). For example, the I/O processor 100 acquires the data according to the read request from the recording device 30 and outputs the data to the application on the VM 54.

The I/O processor 100 caches the data, which is acquired from the recording device 30, in the SSD 51 and updates the tag information 2a (step S605). The I/O processor 100 updates the version information 13b in the SSD 51 to the version information 13b acquired from the recording device 30.

The I/O processor 100 updates the index information 2e in the memory 52 (step S606) and ends the processing. The I/O processor 100 updates the shortened version information 13d in the memory 52 by using the version information 13b acquired from the recording device 30.

If there is a possibility that the data according to the read request is cached in the SSD 51 (YES at step S603), the I/O processor 100 accesses the tag information in the SSD 51 (step S607).

The I/O processor 100 determines whether or not there is the data cached in the SSD 51 (step S608). If there is the data cached in the SSD 51 (YES at step S608). The I/O processor 100 determines whether the version information 13b in the SSD 51 is the latest one (step S609). For example, the I/O processor 100 determines whether the version information 13b in the SSD 51 and the version information 13b contained in the read request match.

If the version information 13b in the SSD 51 is the latest one (YES at step S609), the I/O processor 100 acquires the data according to the read request from the SSD 51 (step S610) and ends the processing. For example, the I/O processor 100 acquires the data according to the read request from the SSD 51 and outputs the data to the application running on the VM 54.

On the other hand, if there is not the data cached in the SSD 51 (NO at step S608), the I/O processor 100 moves to the processing at step S604. If the version information 13b in the SSD 51 is not the latest one (NO at step S609), the I/O processor 100 moves to the processing at step S604.

The effects from the I/O processor 100 according to the third embodiment will be described here. The I/O processor 100 receives information representing that the recording device 30 has been mounted. Upon receiving the information representing that the recording device 30 has been mounted, the I/O processor 100 updates the version information stored in the recording device 30. Upon receiving, as an access request, a read request for the data, the I/O processor 100 determines whether or not the version information corresponding to the read request and stored in the SSD 51 and the version information corresponding to the read request and stored in the recording device 30 match. The I/O processor 100 performs access control to accesses the SSD 51 if determining that the sets of version information match, and to access the recording device 30 if determining that the sets of version information do not match. For this reason, the I/O processor 100 can prevent the old-version data from being updated by the recording device 30.

[d] Fourth Embodiment

The embodiments of the present invention have been described above. The present invention may be applied to embodiments other than the above-described embodiments. Such other embodiments will be described below.

The above-described embodiments may be combined properly within a range where the processing contents do not conflict. For example, the first to third embodiments may be combined such that the I/O processor 100 uses the index information containing the overflow information 8b and the shortened version information 13d.

Figure 16:
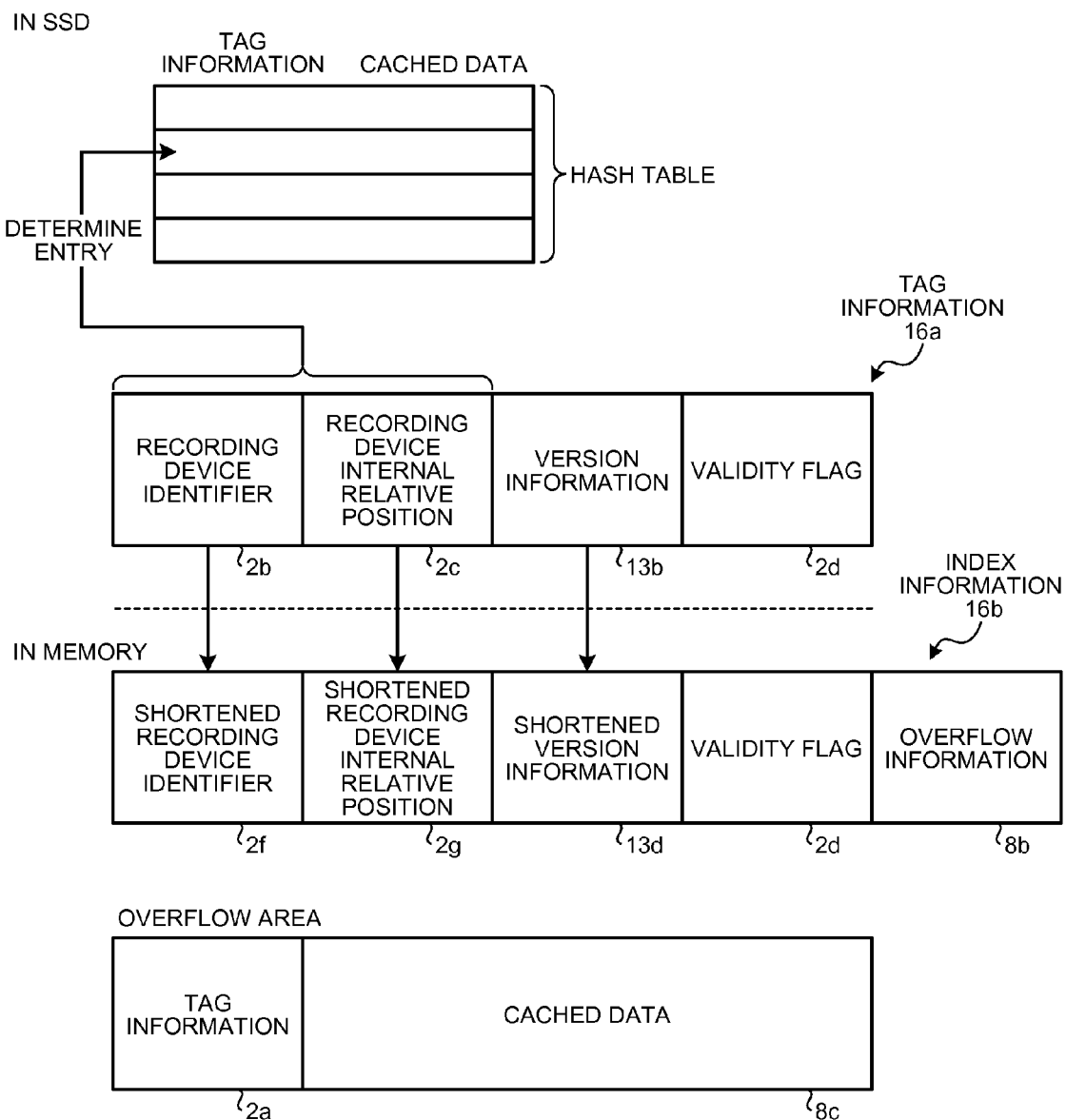
FIG. 16 is a diagram to describe exemplary tag information and index information according to a fourth embodiment.

Exemplary tag information and index information according to a fourth embodiment will be described with reference to FIG. 16. FIG. 16 is a diagram to describe the exemplary tag information and index information according to the fourth embodiment.

As depicted in FIG. 16, tag information 16a stored in the SSD 51 contains the recording device identifier 2b, the recording device internal relative position 2c, the version information 13b, and the validity flag 2d. Index information 16b stored in the memory 52 contains the shortened recording device identifier 2f, the shortened recording device internal relative position 2g, the shortened version information 13d, the validity flag 2d, and the overflow information 8b. In the overflow area of the memory 52, the information where the tag information 2a and the cached data 8c are associated is stored.

Figure 17:
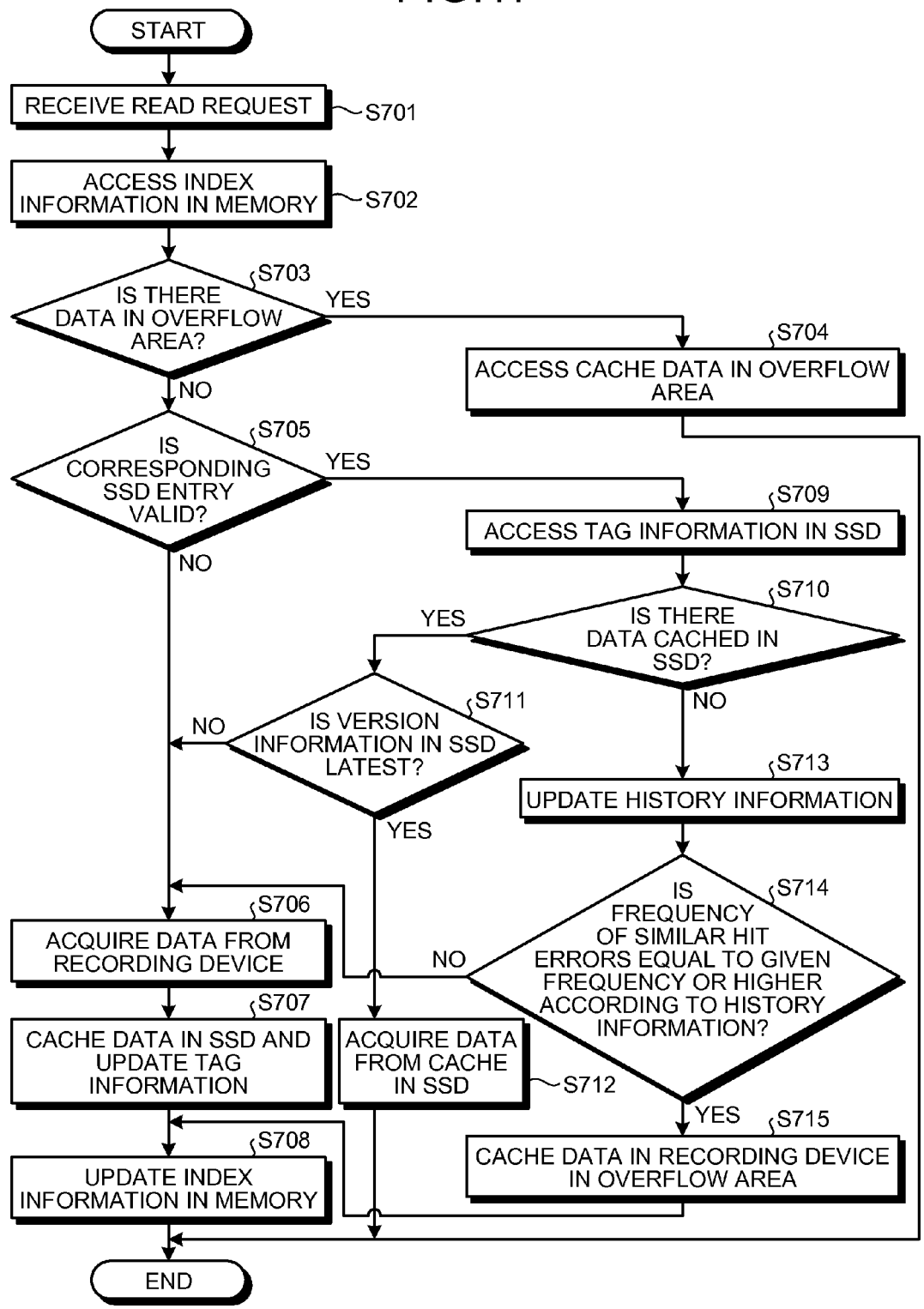
FIG. 17 is a flowchart of a procedure of data read processing according to the fourth embodiment.

The procedure of the data read processing according to the fourth embodiment will be described here with reference to FIG. 17. FIG. 17 is a flowchart of the procedure of the data read processing according to the fourth embodiment. Execution of the processing depicted in FIG. 17 is triggered by, for example, the request extracting unit's receiving of the read request from the application running on the VM 54.

The I/O processor 100 receives a read request from the application running on the VM 54 (step S701). The I/O processor 100 accesses the index information in the memory 52 (step S702).

The I/O processor 100 determines whether or not the data according to the read request is in the overflow area (step S703). If the data is in the overflow area (YES at step S703), the I/O processor 100 accesses the data cached in the overflow area (step S704) and ends the processing. For example, the I/O processor 100 acquires the data according to the read request from the overflow area and outputs the data to the application running on the VM 54.

On the other hand, if the data is not in the overflow area (NO at step S703), the I/O processor 100 determines whether or not the corresponding SSD entry is valid or not (step S705). For example, the I/O processor 100 determines that the SSD entry is valid if the validity flag 2d is "1", and determines that the SSD entry is invalid if the validity flag 2d is "0".

If the SSD entry is invalid (NO at step S705), the I/O processor 100 acquires the data from the recording device 30 (step S706). For example, the I/O processor 100 acquires the data according to the read request from the recording device 30 and outputs the data to the application on the VM 54.

The I/O processor 100 caches the data acquired from the recording device 30 in the SSD 51 and stores the tag information 2a (step S707). The I/O processor 100 stores the index information 2e in the memory 52 (step S708) and ends the processing.

On the other hand, if the SSD entry is valid (YES at step S705), the I/O processor 100 accesses the tag information 2a in the SSD 51 (step S709).

The I/O processor 100 determines whether or not there is the data cached in the SSD 51 (step S710). If there is the data cached in the SSD 51 (YES at step S710), the I/O processor 100 determines whether or not the version information in the SSD 51 is the latest one (step S711). If the version information is the latest one (YES at step S711), the I/O processor 100 acquires the data according to the read request from the SSD 51 (step S712) and ends the processing. If the version information is not the latest one (NO at step S711), the I/O processor 100 moves to the processing at step S706.

If there is not the data cached in the SSD 51 (NO at step S710), the I/O processor 100 updates the history information (step S713). The I/O processor 100 determines whether or not the frequency of similar hit errors is equal to the given frequency or higher according to the history information (step S714). If the frequency of similar hit errors is equal to the given frequency or higher (YES at step S714), the I/O processor 100 caches, in the overflow area, the data in the recording device 30 (step S715) and moves to the processing at step S708.

On the other hand, if the frequency of hit errors is lower than the given frequency (NO at step S714), the I/O processor 100 moves to the processing at step S706.

In this manner, the first to third embodiments may be combined so that the I/O processor 100 can use the index information containing the overflow information 8b and the shortened version information 13d.

The I/O processor 100 may be applied to an information processing system different from the information processing system to which the I/O processor 100 is applied in the above-described embodiments.

Figure 18:
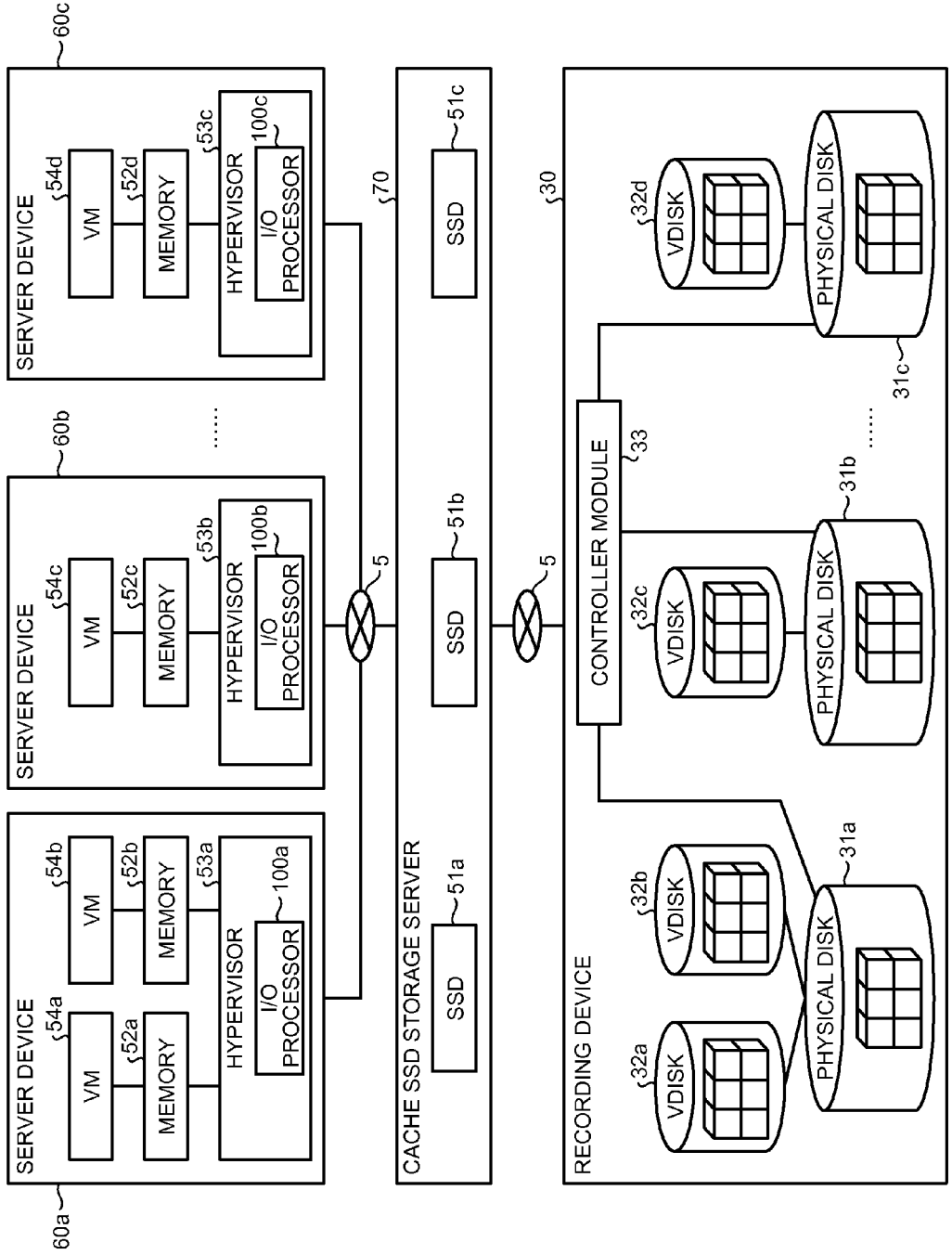
FIG. 18 is a block diagram of a functional configuration of an information processing system according to the fourth embodiment.
Figure 19:
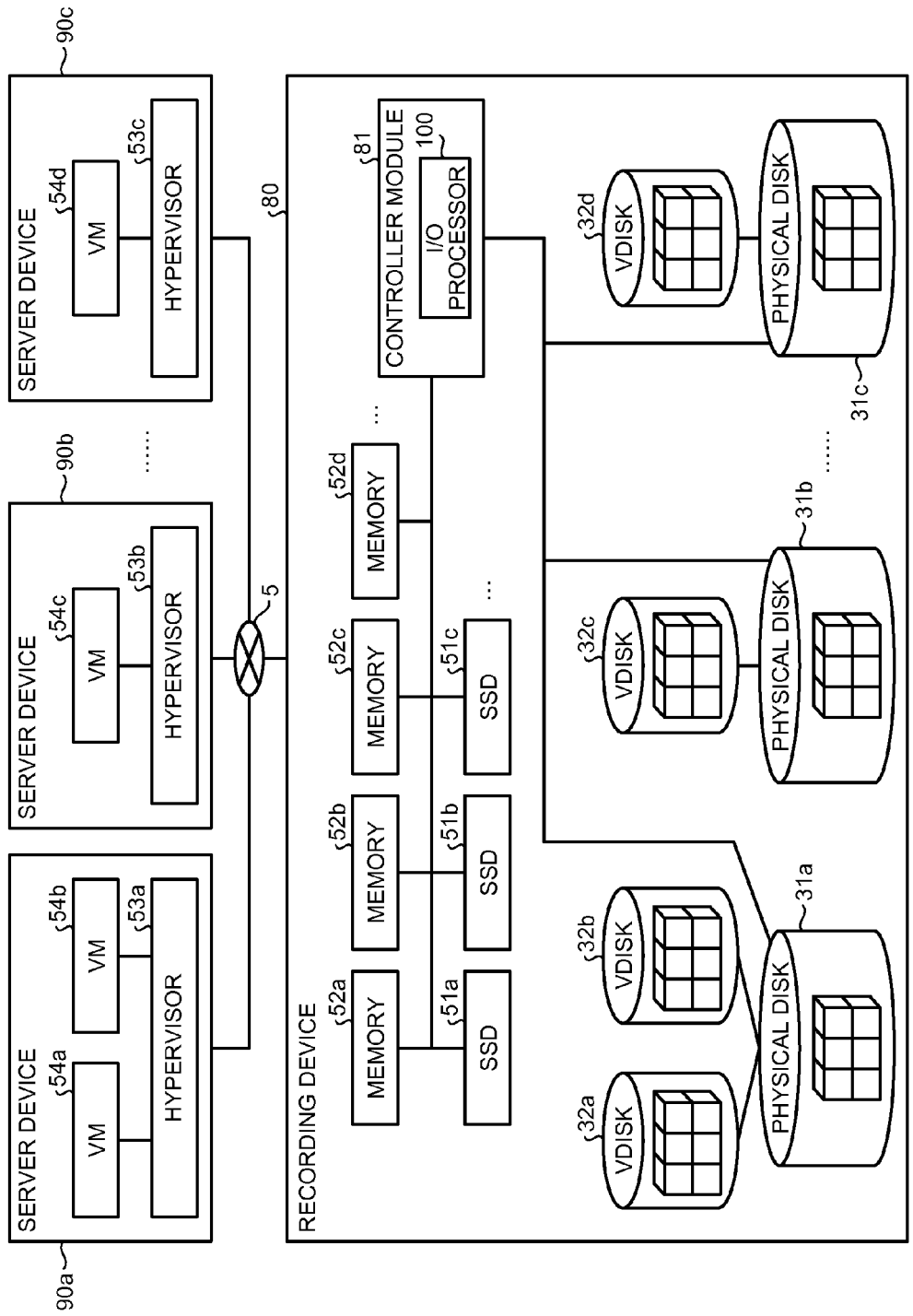
FIG. 19 is a block diagram of a functional configuration of the information processing system according to the fourth embodiment.

With reference to FIGS. 18 and 19, exemplary functional configurations of the information processing system according to the fourth embodiment will be described. FIGS. 18 and 19 are block diagrams of functional configurations of the information processing system according to the fourth embodiment.

In the example depicted in FIG. 18, the information processing system includes the recording device 30, server devices 60a, 60b and 60c, and a cache SSD storage server 70. The recording device 30, the server devices 60a, 60b and 60c, and the cache SSD storage server 70 are connected one another via the network 5. In the example depicted in FIG. 18, the information processing system includes the three server devices 60a, 60b and 60c; however, the configuration is not limited to that depicted in FIG. 18. In other words, any number of server devices 60 may be connected to the information processing system. The server device 60 is used to generally refer to the server devices 60a, 60b and 60c without distinction.

The cache SSD storage server 70 includes a plurality of SSDs 51. In the information processing system depicted in FIG. 18, the cache SSD storage server 70 is a server device for caching the data that is transmitted from the recording device 30 to the server device 60. The server device 60 basically has the same configuration as that of the server device 50 and is different from the server device 50 in that the server device 60 does not include any SSD 51. The I/O processor 100 functions in the hypervisor 53 of the server device 60.

In the example depicted in FIG. 19, an information processing system includes a recording device 80 and server devices 90a, 90b and 90c. The recording device 80 and the server devices 90a, 90b and 90c are connected one another via the network 5. In the example depicted in FIG. 19, the information processing system includes the three server devices 90a, 90b and 90c; however, the configuration is not limited to that depicted in FIG. 18. In other words, any number of server devices 90 may be connected to the information processing system. The server device 90 is used to generally refer to the server devices 90a, 90b and 90c without distinction.

The recording device 80 basically has the same configuration as that of the recording device 30 and is different from the recording device 30 in that the recording device 80 further includes a controller module 81, and at least one SSD 51 and at least one memory 52. The controller module 81 basically has the same configuration as that of the controller module 33 and is different from the controller module 33 in that the controller module 81 includes the I/O processor 100.

Upon receiving an access request that is transmitted from the VM 54a, the I/O processor 100 depicted in FIGS. 18 and 19 refers to the index information stored in the memory 52a to determine whether to access the SSD 51a or access the recording device 30. Accordingly, the I/O processor 100a can increase the accessibility while reducing the usage of the memory 52.

Figure 20:
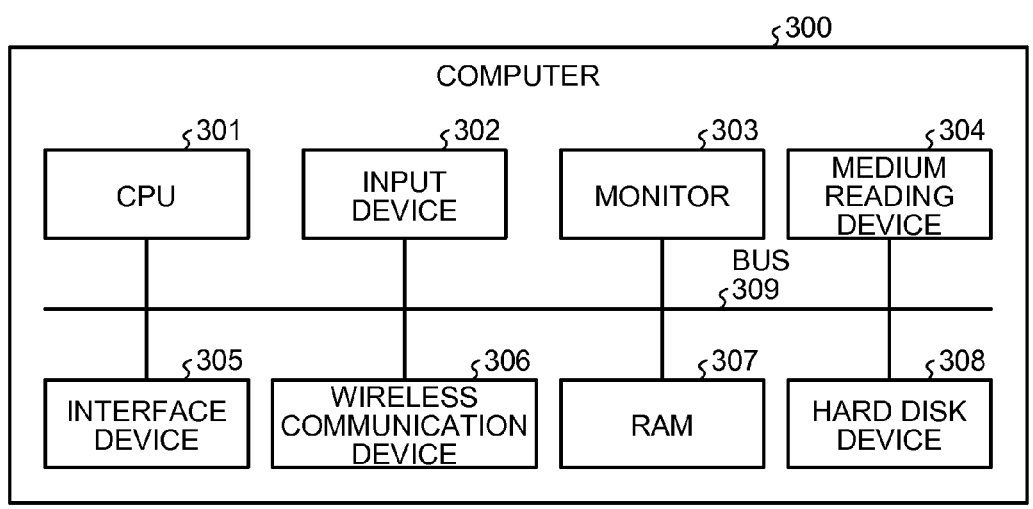
FIG. 20 is a diagram of an exemplary computer that executes a control program.

FIG. 20 is a diagram of an exemplary computer that executes a control program. As depicted in FIG. 20, a computer 300 includes a CPU 301 that executes various types of operation processing, an input device 302 that receives data inputs from a user, and a monitor 303. The computer 300 further includes a medium reading device 304 that reads a program etc. from a storage medium, an interface device 305 for connection to other devices, and a wireless communication device 306 for connections to other devices. The computer 300 further includes a RAM (Random Access Memory) 307 that temporarily stores various types of information and a hard disk device 308. The devices 301 to 308 are connected to a bus 309.

The hard disk device 308 stores a medical information input program with the same functions as those of the processing units: the request extracting unit 101, the data reading unit 102, the data writing unit 103, and the index manager 104 depicted in FIG. 4. The hard disk device 308 also stores various types of data for implementing the control program.

The CPU 301 performs various types of processing by reading each program stored in the hard disk device 308, loading the program to the RAM 307, and executing the program. These programs can cause the computer to function as the request extracting unit 101, the data reading unit 102, the data writing unit 103, and the index manager 104 that are depicted in FIG. 4.

The above-described control program is not necessarily stored in the hard disk device 308. For example, the computer 300 may read the program that is stored in a computer-readable recording medium and execute the program. The computer-readable recording medium corresponds to, for example, a portable recording medium, such as a CD-ROM, a DVD disk, an USB (Universal Serial Bus) memory, a semiconductor memory, such as a flash memory, or a hard disk drive. The program may be stored in a device that is connected to a public line, the Internet, a LAN (Local Area Network), a WAN (Wide Area Network), and the like, and the computer 300 may read the program from them and execute the program. In each of the embodiments, the hypervisor 53 and the VM 54 are implemented in the server device 50. Alternatively, the server device 50 may be in a form of a physical calculator that is not virtualized.

According to an aspect of the technology disclosed herein, an effect that it is possible to increase the accessibility while reducing the memory usage is led.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a control process comprising:
   receiving an access request for a recording device that stores data;
   determining whether or not index information corresponding to the access request, which is received at the receiving, is stored in a memory that stores index information that is obtained by shortening identification information identifying data from the recording device cached in a non-volatile memory;
   accessing the non-volatile memory when it is determined that the index information is stored in the memory and accessing the recording device when it is determined that the index information is not in the memory;
   recording the identification information as a history in the memory when it is determined that the identification information is not in the non-volatile memory; and
   storing the data that is identified by the identification information in the memory when a frequency in which the identification information is recorded as the history at the recording is equal to a predetermined frequency or higher,
   wherein the determining includes determining whether the data corresponding to the access request, which is received at the receiving, is stored in the memory, and
   the accessing performs access control to access the memory when it is determined that the data is stored in the memory, to access the non-volatile memory when it is determined that the index information is stored in the memory, and to access the recording device when it is determined that the index information is not in the memory.

2. The non-transitory computer-readable recording medium according to claim 1, wherein the identification information includes information that identifies the recording device that stores the data and information that specifies a location in which the data is recorded in a recording area of the recording device.

3. The non-transitory computer-readable recording medium according to claim 1,
   wherein the control process further includes, when a virtual machine on which an application that outputs the access request is implemented is restarted, generating index information based on the identification information on the data cached in the non-volatile memory from the recording device.

4. A non-transitory computer-readable recording medium having stored therein a program that causes a computer to execute a control process comprising:
   receiving an access request for a recording device that stores data;
   determining whether or not index information corresponding to the access request, which is received at the receiving, is stored in a memory that stores index information that is obtained by shortening identification information identifying data from the recording device cached in a non-volatile memory; and
   accessing the non-volatile memory when it is determined that the index information is stored in the memory and accessing the recording device when it is determined that the index information is not in the memory,
wherein the control process further includes updating version information representing a version of the data stored in the recording device,
wherein the receiving includes receiving information representing that the recording device is mounted,
the updating includes updating the version information, which is stored in the recording device, when the information representing that the recording device has been mounted is received,
the determining includes determining, when a read request for the data is received as the access request, whether or not first version information corresponding to the read request, the first version information being stored in the non-volatile memory, and second version information corresponding to the read request, the second version information being stored in the recording device, match, and
the accessing performs access control to access the non-volatile memory when it is determined that the first version information and the second version information match and to access the recording device when it is determined that the first version information and the second version information do not match.

5. A control method comprising:
receiving an access request for a recording device that stores data by a processor;
determining whether or not index information corresponding to the access request, which is received at the receiving, is stored in a memory that stores index information that is obtained by shortening identification information identifying data from the recording device cached in a non-volatile memory by the processor;
accessing the non-volatile memory when it is determined that the index information is stored in the memory and accessing the recording device when it is determined that the index information is not in the memory by the processor;
recording the identification information as a history in the memory when it is determined that the identification information is not in the non-volatile memory; and
storing the data that is identified by the identification information in the memory when a frequency in which the identification information is recorded as the history at the recording is equal to a predetermined frequency or higher,
wherein the determining includes determining whether the data corresponding to the access request, which is received at the receiving, is stored in the memory, and
the accessing performs access control to access the memory when it is determined that the data is stored in the memory, to access the non-volatile memory when it is determined that the index information is stored in the memory, and to access the recording device when it is determined that the index information is not in the memory.

6. The control method according to claim 5, wherein the identification information includes information that identifies the recording device that stores the data and information that specifies a location in which the data is recorded in a recording area of the recording device.

7. The control method according to claim 5, further including generating, when a virtual machine on which an application that outputs the access request is implemented is restarted, index information based on the identification information on the data cached in the non-volatile memory from the recording device by the processor.

8. A control method comprising:
receiving an access request for a recording device that stores data by a processor;
determining whether or not index information corresponding to the access request, which is received at the receiving, is stored in a memory that stores index information that is obtained by shortening identification information identifying data from the recording device cached in a non-volatile memory by the processor; and
accessing the non-volatile memory when it is determined that the index information is stored in the memory and accessing the recording device when it is determined that the index information is not in the memory by the processor, further including updating version information representing a version of the data stored in the recording device by the processor,
wherein the receiving includes receiving information representing that the recording device is mounted,
the updating includes updating the version information, which is stored in the recording device, when the information representing that the recording device has been mounted is received,
the determining includes determining, when a read request for the data is received as the access request, whether or not first version information corresponding to the read request, the first version information being stored in the non-volatile memory, and second version information corresponding to the read request, the second version information being stored in the recording device, match, and
the accessing performs access control to access the non-volatile memory when it is determined that the first version information and the second version information match and to access the recording device when it is determined that the first version information and the second version information do not match.

9. A control device comprising:
a processor configured to execute a process including:
receiving an access request for a recording device that stores data;
determining whether or not index information corresponding to the access request, which is received at the receiving, is stored in a memory that stores index information that is obtained by shortening identification information identifying data from the recording device cached in a non-volatile memory;
accessing the non-volatile memory when it is determined that the index information is stored in the memory and accessing the recording device when it is determined that the index information is not in the memory;
recording the identification information as a history in the memory when it is determined that the identification information is not in the non-volatile memory; and
storing the data that is identified by the identification information in the memory when a frequency in which the identification information is recorded as the history at the recording is equal to a predetermined frequency or higher,
wherein the determining includes determining whether the data corresponding to the access request, which is received at the receiving, is stored in the memory, and
the accessing performs access control to access the memory when it is determined that the data is stored in the memory, to access the non-volatile memory when it is determined that the index information is stored in the memory, and to access the recording device when it is determined that the index information is not in the memory.

10. The control device according to claim 9, wherein the identification information includes information that identifies the recording device that stores the data and information that specifies a location in which the data is recorded in a recording area of the recording device.

11. The control device according to claim 9,
wherein the process further includes, when a virtual machine on which an application that outputs the access request is implemented is restarted, generating index information based on the identification information on the data cached in the non-volatile memory from the recording device.

12. A control device comprising:
a processor configured to execute a process including:
receiving an access request for a recording device that stores data;
determining whether or not index information corresponding to the access request, which is received at the receiving, is stored in a memory that stores index information that is obtained by shortening identification information identifying data from the recording device cached in a non-volatile memory; and
accessing the non-volatile memory when it is determined that the index information is stored in the memory and accessing the recording device when it is determined that the index information is not in the memory,
wherein the process further includes updating version information representing a version of the data stored in the recording device,
wherein the receiving includes receiving information representing that the recording device is mounted,
the updating includes updating the version information, which is stored in the recording device, when the information representing that the recording device has been mounted is received,
the determining includes determining, when a read request for the data is received as the access request, whether or not first version information corresponding to the read request, the first version information being stored in the non-volatile memory, and second version information corresponding to the read request, the second version information being stored in the recording device, match, and
the accessing performs access control to access the non-volatile memory when it is determined that the first version information and the second version information match and to access the recording device when it is determined that the first version information and the second version information do not match.

* * * * *